United States Patent
Hashii et al.

(10) Patent No.: US 8,482,804 B2
(45) Date of Patent: Jul. 9, 2013

(54) IMAGE PROCESSING APPARATUS AND IMAGE PROCESSING METHOD

(75) Inventors: Yusuke Hashii, Kawasaki (JP); Fumihiro Goto, Kawasaki (JP); Tetsuya Suwa, Yokohama (JP); Fumitaka Goto, Tokyo (JP); Ayumi Hori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 764 days.

(21) Appl. No.: 12/056,407

(22) Filed: Mar. 27, 2008

(65) Prior Publication Data
US 2008/0239410 A1 Oct. 2, 2008

(30) Foreign Application Priority Data
Mar. 30, 2007 (JP) ................. 2007-093551

(51) Int. Cl.
*G06T 5/00* (2006.01)
*H04N 1/407* (2006.01)
*H04N 1/409* (2006.01)
*H04N 1/56* (2006.01)
*H04N 1/58* (2006.01)
*H04N 1/60* (2006.01)
*G03F 3/10* (2006.01)

(52) U.S. Cl.
USPC ........... 358/3.27; 358/1.9; 358/2.1; 358/3.06; 358/3.26; 358/501; 358/505; 358/518; 358/520; 358/521; 358/530; 358/538; 358/453; 358/462; 358/463; 382/162; 382/164; 382/167; 382/176

(58) Field of Classification Search
USPC ................. 358/1.9, 2.1, 3.06, 3.26, 3.27, 501, 358/505, 518, 521, 520, 530, 538, 453, 462, 358/463; 382/162, 164, 167, 176
See application file for complete search history.

(56) References Cited

U.S. PATENT DOCUMENTS
6,704,123 B1 * 3/2004 Av-Shalom et al. ......... 358/2.99
6,903,844 B1 * 6/2005 Kamiya ........................ 358/2.1
(Continued)

FOREIGN PATENT DOCUMENTS
JP 10-155087 A 6/1998
JP 2001-028694 1/2001
(Continued)

OTHER PUBLICATIONS
Japanese Office Action dated May 27, 2011 in corresponding Japanese Application No. 2007-093551.

*Primary Examiner* — King Poon
*Assistant Examiner* — Beniyam Menberu
(74) *Attorney, Agent, or Firm* — Fitzpatrick, Cella, Harper & Scinto

(57) ABSTRACT

A pixel in a photograph region image to be subjected to blacking is subjected to a brightness modulation processing so that the pixel is modulated to any of "a pixel having the brightness to be subject to blacking" and "a pixel having the brightness not to be subject to blacking". Specifically, the modulation by noise addition converts some pixels for which original pixel values are to be subjected to blacking to a pixel having the brightness not subjected to blacking. Thereby, "a pixel having the brightness not to be subject to blacking" thus converted has no change in brightness in the blacking processing. Consequently, a pixel at which the blacking processing is not generated can be caused to exist in the photograph image. As a result, even when the blacking processing set for character/line region is similarly set for the photograph region, the effect of the blacking can be reduced.

21 Claims, 28 Drawing Sheets

U.S. PATENT DOCUMENTS

| | | | |
|---|---|---|---|
| 6,961,460 B2 * | 11/2005 | Nagai et al. | 382/162 |
| 7,009,734 B2 | 3/2006 | Suwa et al. | 358/1.9 |
| 7,016,530 B2 | 3/2006 | Saito et al. | 382/162 |
| 7,075,679 B2 | 7/2006 | Goto et al. | 358/3.01 |
| 7,076,112 B2 * | 7/2006 | Crabtree | 382/254 |
| 7,274,491 B2 | 9/2007 | Yamada et al. | 358/3.06 |
| 7,463,393 B2 * | 12/2008 | Shoda | 358/518 |
| 7,636,472 B2 * | 12/2009 | Maruoka | 382/167 |
| 2001/0021034 A1 * | 9/2001 | Suzuki et al. | 358/1.9 |
| 2002/0025079 A1 * | 2/2002 | Kuwata et al. | 382/254 |
| 2004/0165081 A1 * | 8/2004 | Shibaki et al. | 348/222.1 |
| 2007/0030498 A1 | 2/2007 | Hori et al. | 358/1.9 |
| 2007/0030499 A1 | 2/2007 | Hori | 358/1.9 |
| 2007/0139674 A1 * | 6/2007 | Kawano et al. | 358/1.9 |
| 2007/0292045 A1 * | 12/2007 | Akatsuka | 382/274 |
| 2008/0002901 A1 | 1/2008 | Miyagi et al. | 382/260 |
| 2008/0018939 A1 | 1/2008 | Yamada et al. | 358/3.06 |
| 2008/0068626 A1 * | 3/2008 | Bala et al. | 358/1.9 |
| 2009/0128871 A1 * | 5/2009 | Patton et al. | 358/520 |

FOREIGN PATENT DOCUMENTS

| | | |
|---|---|---|
| JP | 2001-144943 A | 5/2001 |
| JP | 2001-218021 | 8/2001 |
| JP | 2001-251513 A | 9/2001 |
| JP | 2002-218271 A | 8/2002 |
| JP | 2005-107872 | 4/2005 |

* cited by examiner

| y \ x | 0 | 1 | 2 |
|---|---|---|---|
| 0 | +1 | -1 | +1 |
| 1 | -1 | +1 | -1 |
| 2 | +1 | -1 | +1 |

FIG.11

IMAGE PROCESSING APPARATUS AND IMAGE PROCESSING METHOD

BACKGROUND OF THE INVENTION

1. Field of the Invention

The present invention relates to an image processing apparatus and an image processing method. In particular, the present invention relates to an application of a smoothing processing to an image and manner of the application.

2. Description of the Related Art

Recently, multi function machines including an ink jet print type printing mechanism and a scanner mechanism (hereinafter also referred to as IJMFP) have been widely provided. IJMFP is a printer that can be connected to a personal computer (PC) to provide various applications such as a function to perform printing and scanning, a copy function of the machine itself, and a function by which the machine is connected to a digital camera for direct printing. Thus, the multi function machines have been used as a copying machine for family use for example. The copy function of IJMFP reads a document image by a scanner mechanism to print the image on a printing medium such as a paper.

In the copying as described above, the color reproduction range and the like is generally different depending on the type of a document to be copied. Thus, there may be a case where the document and a copy output have difficulty in having identical visual colors. There may be another case where different gradation characteristics may be reproduced depending on the type of a document.

To solve this problem, Japanese Patent Laid-Open No. 2001-251513 proposes a technique using image region segmentation. Specifically, this publication describes a method for segmenting a read image to at least a halftone dot region and a photo region and subjecting the respective regions to optimal γ conversions to provide favorable images in all regions. Also, Japanese Patent Laid-Open No. 2002-218271 describes a method for similarly segmenting a read image to a character region and a photograph region and subjecting the respective regions to optimal color space conversions to provide favorable images in all regions.

When a copy is made on a plain paper through the IJMFP, since a color reproduction range by the plain paper is narrow compared with those of document images of a printed matter, silver halide photograph and the like, some color compression methods may cause deterioration in a gradation characteristic such as contouring and losing gradation. For such a problem, Japanese Patent Laid-Open No. H10-155087 discloses a method for detecting an edge amount of a character in an image and adding a random number to the image depending on the amount so that the contour in a continuous gradation can be suppressed without damaging the sharpness of characters. Similarly, Japanese Patent Laid-Open No. 2001-144943 discloses a technique according to which a region is set in a part of multivalued color image data to which random number data is added and the random number data is added only to the set region so that a gradation jump is corrected and original images in the remaining regions are maintained.

As described above, there has been a problem in which an input image such as a document image in the case of a copy has a different color reproduction range from that by a printing apparatus. This problem has been generally addressed by the use of a color compression technique. However, when a color reproduction range is narrow as in the case where a plain paper is used in the ink jet method, it is difficult for a single color compression method to realize an optimal color reproduction for both of a character image and a photograph image.

For example, when a color compression is performed with a high contrast so as to clearly represent characters, a photograph subjected to the same color compression may lose the gradation in a high density region and a high chroma region. On the other hand, when a color compression in which an importance is placed on the gradation characteristic is carried out so as not to break the gradation of a photograph image, characters subjected to the same color compression may have black characters or the like which are printed in a further lighter color. Specifically, characters written by a pencil that have a low density, characters that are not the so-called solid-black ones, or black characters outputted to a plain paper based on the ink jet method are printed in further lighter color, thus clear characters cannot be outputted.

In order to realize the printing of both of character images and photograph images, Japanese Patent Laid-Open No. 2001-251513 and Japanese Patent Laid-Open No. 2002-218271 have been proposed as described above. However, when a plurality of color compression tables or a gamma processing tables are switched and used for the respective images, a problem is caused where a memory for retaining tables suitable for the respective character and photograph images are required.

As methods in which a processing is changed depending on an image area without increasing tables, Japanese Patent Laid-Open No. H10-155087 and Japanese Patent Laid-Open No. 2001-144943 has been proposed as described above. However, the techniques described in these publications add noise to a part at which a contour is caused to improve the gradation reproduction characteristic and thus eliminates an originally-caused contour. Therefore, these techniques are not a technique that considers an influence by a subsequent image conversion to reduce the effect of the image conversion processing.

SUMMARY OF THE INVENTION

The object of the present invention is to provide an image processing apparatus and an image processing method that can realize favorable reproducibilities of both of a character image and a photograph image for example without increasing the number of processing for the respective image areas such as processing using tables.

In a first aspect of the present invention, there is provided an image processing apparatus that executes image processing including processing performed for values of pixels of a predetermined region in an image data, said apparatus comprising: a pixel value modulation unit that performs a modulation of the pixel values so that pixels which are objects of the processing for pixel values are reduced.

Preferably, further comprising an image determination unit that determines a type of image data, and wherein when said image determination unit determines that the image data is of a type of an image other than a character/line image, said pixel value modulation unit performs the modulation of the pixel values.

In a second aspect of the present invention, an image processing method for executing image processing including processing performed for values of pixels of a predetermined region in an image data, said method comprising: a pixel value modulation step of performing a modulation of the pixel values so that pixels which are objects of the processing for pixel values are reduced.

Preferably, further comprising an image determination step for determining a type of image data, and wherein when said image determination step determines that the image data is of a type of an image other than a character/line image, said pixel value modulation step performs the modulation of the pixel values.

According to the above described configuration, pixel values are modulated so as to cause a smaller number of pixels subjected to a processing such as blacking and chroma enhancement. This allows, even when a photograph image for example is subjected to the above processing, the effect of the processing to be reduced to provide a printing result in the photograph image that is free from losing of gradation. On the other hand, character/lines such as characters and ruled lines are subjected to the processing to provide a clear printing result.

As a result, favorable reproducibilities of a character image and a photograph image can be both established without increasing the number of processings for the respective image areas such as a processing using a table.

Further features of the present invention will become apparent from the following description of exemplary embodiments (with reference to the attached drawings).

BRIEF DESCRIPTION OF THE DRAWINGS

FIG. 3B shows a document stand cover that also functions as an auto document feeder is opened;

FIG. 11 is a diagram illustrating a relation between a modulation sign F and a object pixel coordinate according to the first embodiment;

DESCRIPTION OF THE EMBODIMENT

Figure 1A:
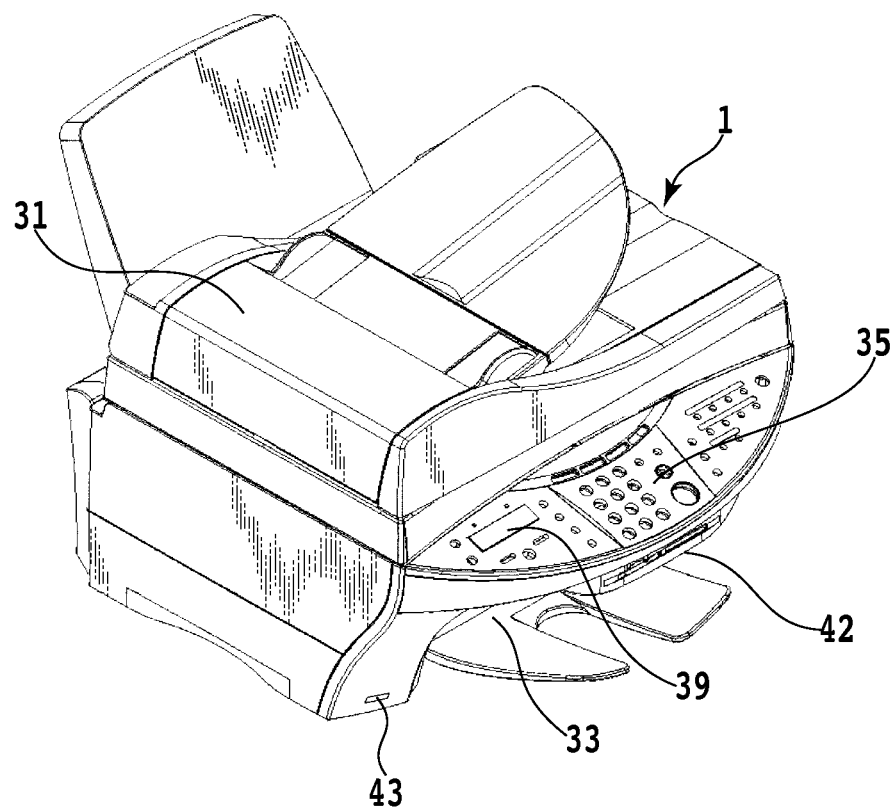
FIGS. 1A and 1B are an appearance perspective view and a perspective view of a multi-function printer (MFP) according to an embodiment of the present invention, respectively.
Figure 1B:
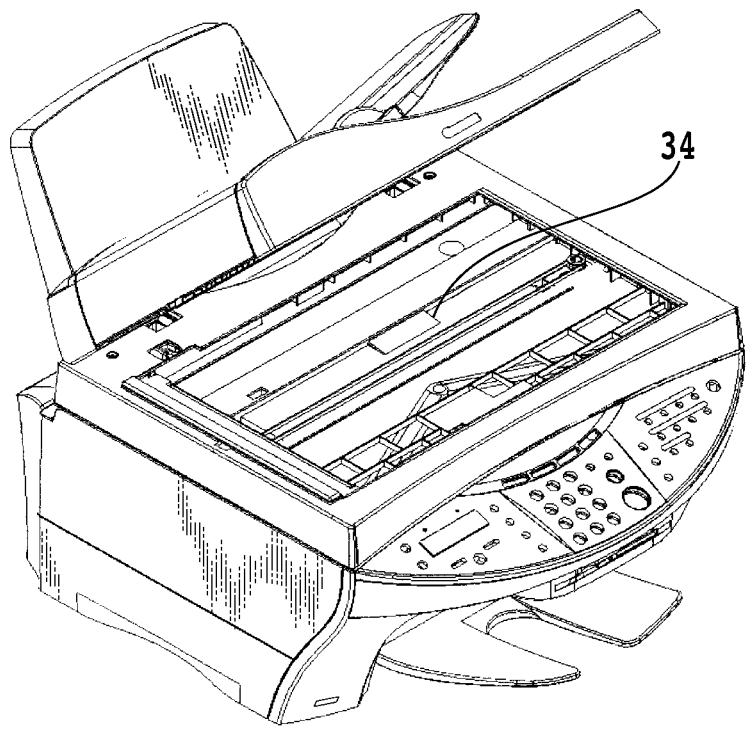

Hereinafter, embodiments of the present invention will be described in detail with reference to the drawings.
MFP FIGS. 1A and 1B are an appearance perspective view and a perspective view of a multi-function printer (MFP), which shows a cover being opened that is a document cover and also functions as an auto document feeder, according to an embodiment of the present invention, respectively. The MFP apparatus 1 has a function as a general PC printer to receive data from a host computer (PC) to print the data and a scanner function. The MFP apparatus 1 also has a copy function in which the printer prints an image read by the scanner, a function to directly read image data stored in a storage medium such as a memory card to print the data, or a function to receive image data from a digital camera to print the data.

The MFP apparatus 1 includes a reading apparatus 34 by a scanner including a CCD sensor. The reading apparatus reads a document directly placed on a platen or a document supplied from the auto document feeder (hereinafter ADF) 31. A printing apparatus 33 is an ink jet type apparatus that uses four colors of cyan (C), magenta (M), yellow (Y), and black (K) to provide printing on a printing medium such as a paper.

The MFP apparatus 1 further includes an operation panel 35 that includes a display panel 39 and various key switches for example. The back face of the MFP apparatus 1 includes a USB port (not shown) for the communication with the PC. The MFP apparatus 1 further includes a card slot 42 for reading data from various memory cards and a camera port 43 for the data communication with a digital camera. It is noted that the printing method of the printing apparatus in the application of the present invention is not limited to the ink jet method. For example, the printing method also may be other methods such as an electronic photograph method.

Figure 2:
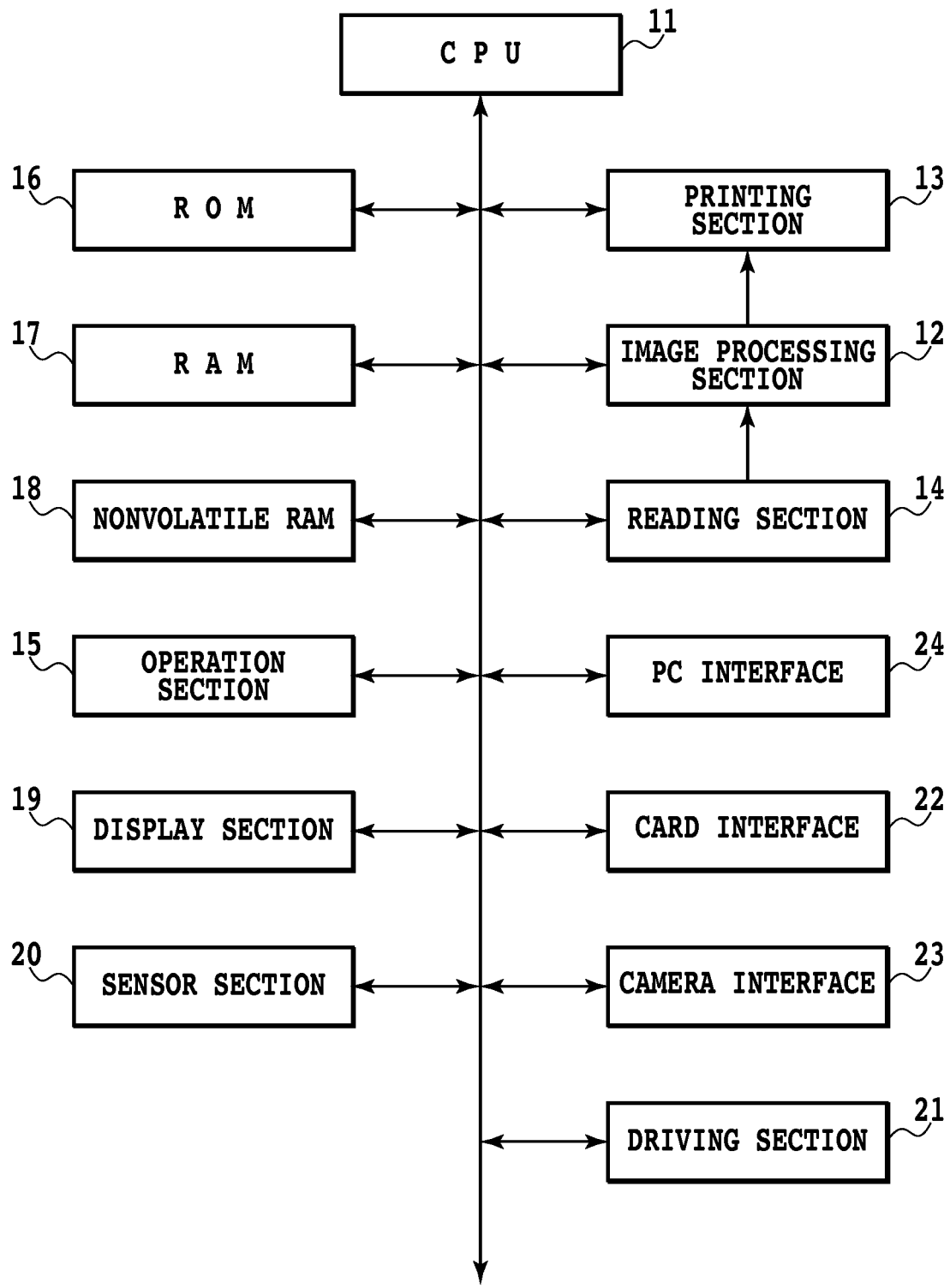
FIG. 2 is a block diagram illustrating a configuration of the control and the image processing for example of the MFP shown in FIGS. 1A and 1B.

FIG. 2 is a block diagram illustrating a configuration for executing a control and image processing of the MFP shown in FIGS. 1A and 1B.

In FIG. 2, a CPU 11 controls various functions of the MFP 1 and carries out, in accordance with a predetermined operation through an operation section 15 having an operation panel 35, an image processing program stored in a ROM 16. This program also includes a processing program of an embodiment of the present invention which will be described later with reference to FIG. 3, FIG. 8, FIG. 11, and FIG. 16 for example. The reading section 14 having the reading apparatus 34 reads a document image to convert the read analog brightness data to digital brightness data of red (R), green (G), and blue (B) to output the data to an image processing section 12. It is noted that the reading section 14 also may include a contact image sensor (CIS) instead of the CCD.

A card interface 22 having the card slot 42 reads, in accordance with the predetermined operation through the operation section 15, image data that is photographed by a digital still camera (hereinafter DSC) and is stored in a memory card for example. The color space of the image data read via the card interface 22 is converted by the image processing section 12, as required, from a DSC color space (e.g., YCbCr) to a standard R, G, and B color space (e.g., NTSC-RGB or sRGB). The read image data is also subjected, based on the header information thereof, various processing required for the application (e.g., resolution conversion for obtaining effective pixels). The camera interface having the camera port 43 is directly connected to the DSC to read image data.

The image processing section 12 executes an image processing which will be described later with reference to FIG. 3, such as an input device color conversion, an image correction/processing, an output device color conversion, a color separation, and a quantization. The resultant printing data obtained by the image processing is stored in the RAM 17. When the printing data stored in the RAM 17 reaches a predetermined amount required for the printing by the printing section 13 having the printing apparatus 33, the printing operation by the printing section 13 is carried out.

A nonvolatile RAM 18 is constituted by a SRAM backed up by a battery for example and stores data unique to the image processing apparatus for example. The operation section includes a photo direct print start key, an order sheet print key, and an order sheet reading key to select the image data stored in the printing medium to start the printing. The nonvolatile RAM 18 further includes a copy start key for monochrome copy or color copy, a mode key for specifying a mode for a copy resolution or an image quality, a stop key for stopping a copy operation for example, and a ten key and a registration key for inputting the number of copies. The CPU 11 detects the depression state of these keys to control the respective section depending on the state.

The display section 19 includes a display panel 39 (FIG. 1A). Specifically, this display section includes a dot matrix type liquid crystal display section (LCD) and a LCD driver to provide various displays based on the control by the CPU 11. The display section 19 also displays thumbnails of image data stored in a storage medium. The printing section 13 having the printing apparatus 33 is constituted by an ink jet type printing head, a general-purpose IC for example and the like and reads, based on the control by the CPU 11, the printing data stored in the RAM 17 to print a hard copy.

A driving section 21 is composed, for example, of a stepping motor and a DC motor for driving a paper feed roller in the above-described reading section 4 and printing section 3; a gear for transmitting the driving force of the stepping motor and the DC motor; and a driver circuit for controlling the stepping motor and the DC motor. The sensor section 20 is composed, for example, of a printing paper width sensor, a printing paper existence sensor, a document width sensor, a document existence sensor, and a printing medium sensor. The CPU 11 detects the states of the document or the printing paper based on the information obtained from these sensors.

The PC interface 24 is an interface between the PC and this MFP apparatus 1. The MFP apparatus receives an instruction for a printing operation and a reading operation through this PC interface 24.

In the configuration as described above, during a copy operation, the image data read by the reading apparatus 34 is subjected to a predetermined image processing by the image processing section 12 and printing is performed by the printing apparatus 33 based on the resulting data of the image processing.

Image Processing

Figure 3:
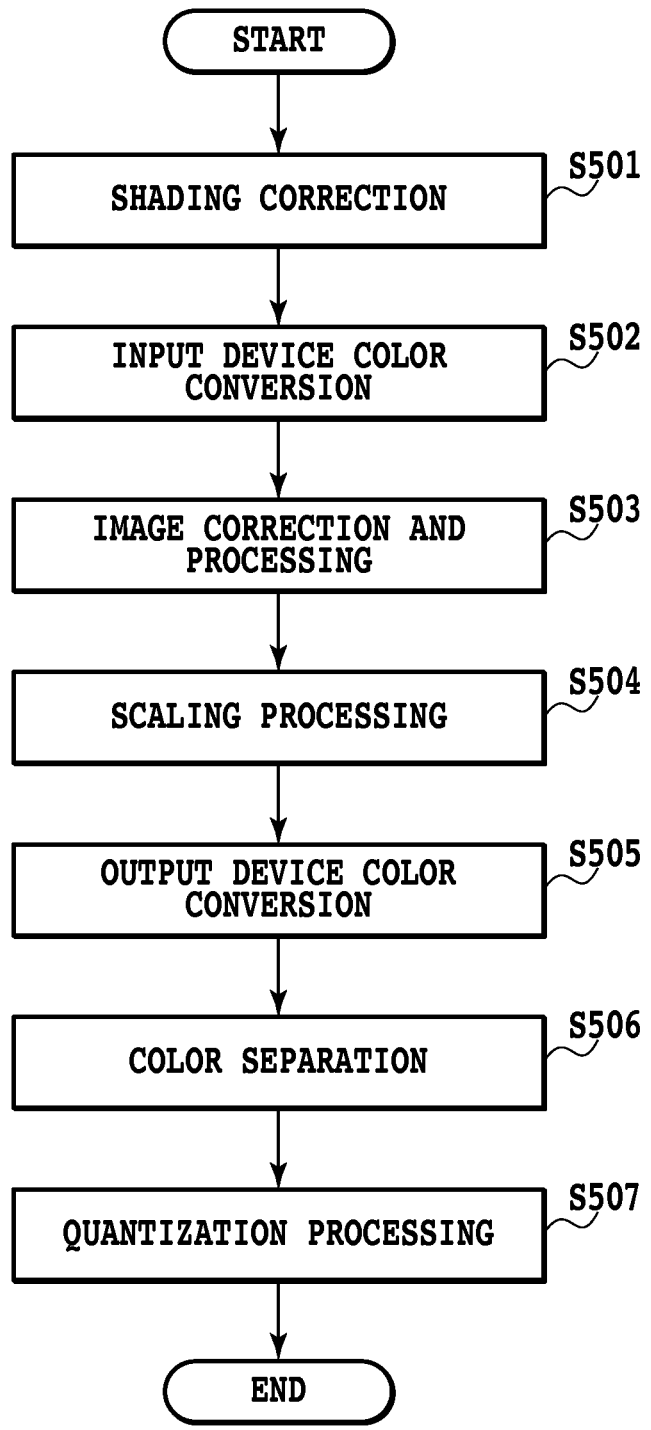
FIG. 3 is a flowchart showing the image processing carried out in the copying operation in the MFP.

FIG. 3 is a flowchart showing an image processing executed in a copy operation in the MFP of this embodiment.

In FIG. 3, at the beginning, Step 501 subjects the data read and AD-converted by the reading section 14 to a shading correction for correcting variations in the data caused due to variations of imaging devices. Next, Step 502 executes an input device color conversion. This conversion can convert the image signal data unique to the color space of the device to signal data of a standard color space not depending on the device. The standard color space may be based on the known ones such as sRGB specified by International Electrotechnical Commission (IEC) and AdobeRGB proposed by Adobe Systems. In this embodiment, the conversion is performed by using a lookup table. It is noted that a matrix calculation method also may be used as a conversion method.

The converted data is subjected in Step 503 to a correction processing/processing. The details of these processing include an edge reinforcement processing for correcting the so-called blur of an image due to the reading operation, a character processing for improving the readability of characters, a processing for removing the offset caused in the reading operation by light emission, and the like. In addition to these processing, a pixel value modulation processing and a pixel value processing according to embodiments of the present invention are also performed, which will be described in detail with reference to FIGS. 9A to 9C and subsequent drawings, as the correction processing and the processing.

Step 504 executes an image scaling processing. In this step, the magnification is converted to an intended magnification when a different magnification is specified by a user or when allocation copy is specified to allocate two manuscript copies to a single paper. The conversion method may generally be a bi-cubic method or a nearest neighbor method.

Next, Step 505 converts image signal data of the standard color space to signal data unique to the printing apparatus as an output device. This conversion is, as described later, a conversion (color conversion of color gamut mapping) by using a gamut mapping.

Next, Step 506 executes a conversion processing for converting the signal data unique to the output device to ink color data of cyan (C), magenta (M), yellow (Y), and black (K) used in the MFP. This conversion also may use the same method as that of Step 502. Then, Step 507 converts the image signal data to have levels at which the data can be printed by the printing apparatus 33. Specifically, the printing apparatus 33 of this embodiment represents an image in a binary manner based on whether ink is ejected or not. Thus, a quantization method such as error diffusion is used to convert the data to binary data.

Next, the color conversion for the output device of Step 505 will be described further in detail. In this embodiment, a lookup table for the color conversion for the output device is defined as an output profile and will be hereinafter also referred to as an output color conversion table.

The output color conversion table shows a correspondence between color signals of the sRGB color space as a standard color space and color signals of a color gamut of the printing apparatus (hereinafter also simply referred to as a printer color gamut). Specifically, the table defines discrete grid points by using the signal data of the sRGB color space and makes correspondences between the respective grid points and color signals of the printer color gamut.

Figure 4:
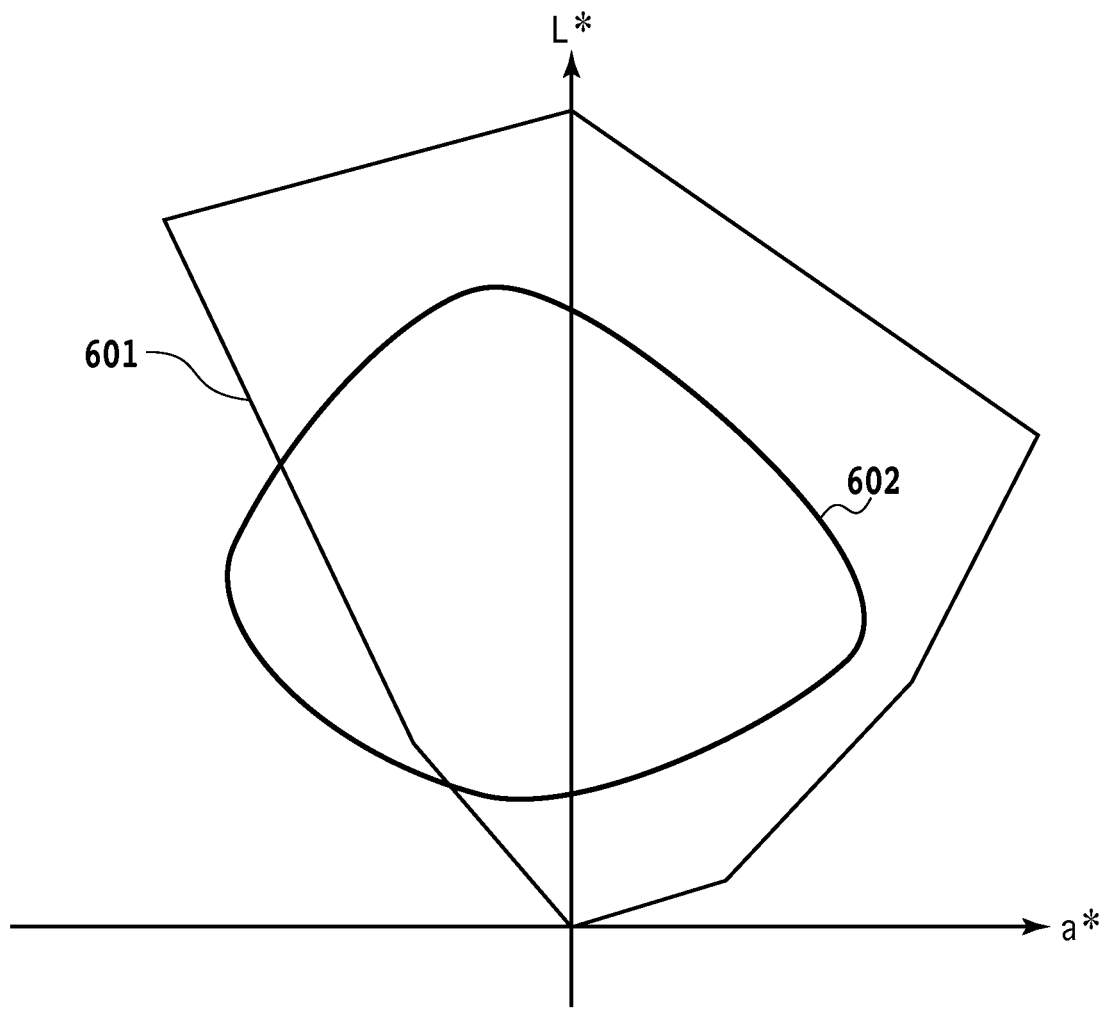
FIG. 4 is a diagram showing a color gamut of a standard color space and a printer color gamut by CIE-L*a*b color coordinate system.

FIG. 4 shows a sRGB color gamut 601 by signals of a sRGB color space as a standard color space and a printer color gamut 602, in a CIE-L*a*b* color coordinate system. Hereinafter, it is assumed that all color spaces shown in the drawings of embodiments of the present invention are represented based on the CIE-L*a*b* color coordinate system. It is noted that this color coordinate system to be handled is not limited to the CIE-L*a*b* color coordinate system and also may be a similar color space such as a L*u*v* color space.

As shown in FIG. 4, the SRGB color gamut 601 and the printer color gamut 602 have different shapes and sizes for example. For this reason, the color conversion table is prepared by using the "gamut compression" technique for compressing the color gamut of the standard color space to the printer color gamut. In the gamut compression used in this embodiment, no-compression region, in which colors of the standard color space are reproduced as colors calorimetrically identical with colors in the printer color gamut, is defined in the printer color gamut, and colors of the standard color space except for the colors reproduced in the no-compression region are compressed to colors in a printer color gamut out of the no-compression region. By using the gamut compression method as described above, colors within the no-compression region can be reproduced to calorimetrically correspond to the color of the color gamut of the standard color space and colors not within the no-compression region can be reproduced to retain the gradation. For example, this gamut compression method allows, even when different printing media used for copy are a photograph-exclusive paper and a mat paper and have difference color gamut shapes, the same colors to be reproduced on these media.

Figure 5:
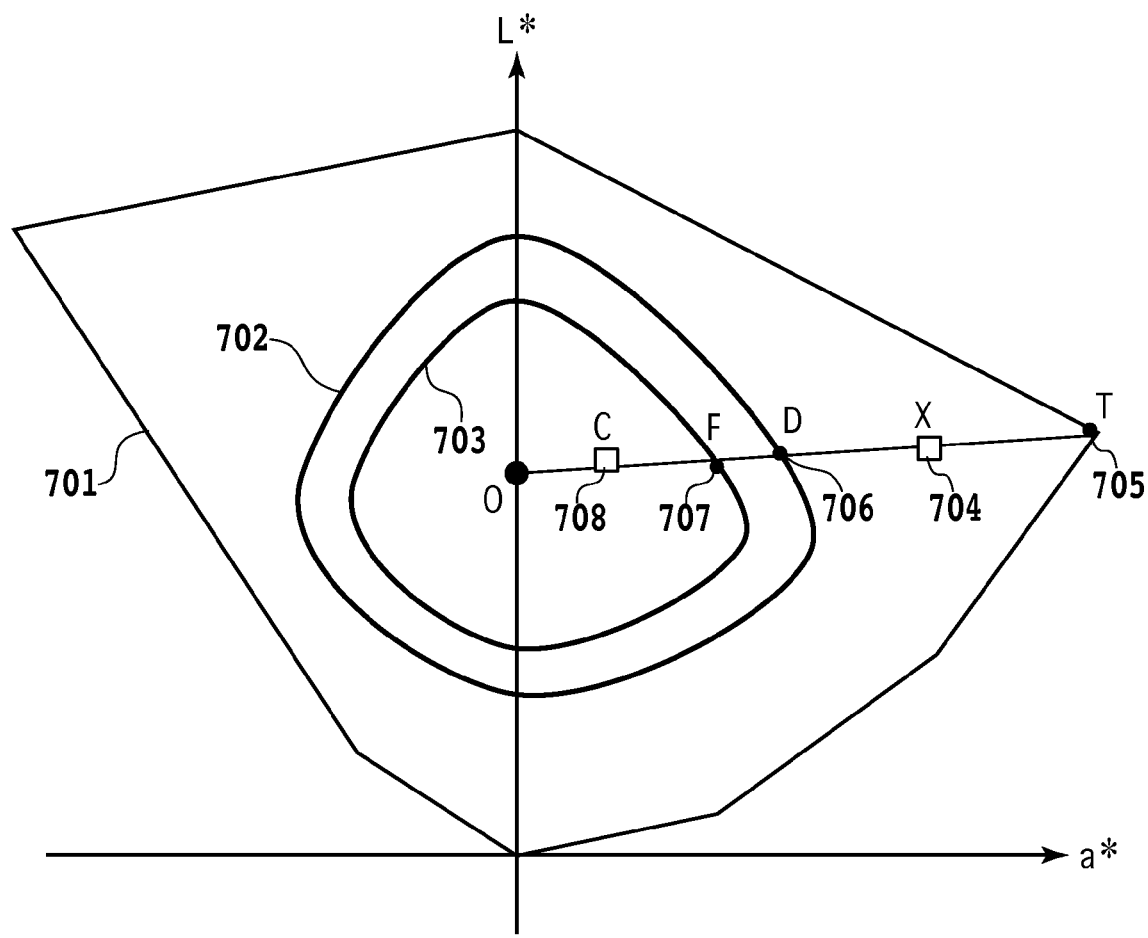
FIG. 5 is a diagram showing an example of the gamut compression used in one embodiment of the present invention.

FIG. 5 is a diagram illustrating an example of the gamut compression used in the output device color conversion shown in FIG. 3. In FIG. 5, the color gamut 701 and the color gamut 702 are obtained by projecting the color gamut of the sRGB color space and the printer color gamut on the L*a plane. The color gamut 703 shows the no-compression region for reproducing the color that is colorimetrically identical with that of the sRGB color space. In this example, the no-compression region has a similar shape as that of the printer color gamut and is 80% of the size of the printer color gamut. The point "O" shows a compression convergence point. The points 704 and 708 show colors corresponding to grid points in the sRGB color space.

The gamut compression firstly determines whether the grid point of the sRGB color space is positioned within the no-compression region or not. This processing for determining whether the point exists within the color gamut or not is performed based on the method as described below. First, a length of a vector (called as a source vector) connecting the point to be determined to the compression convergence point is calculated. Next, a length of a vector having a sense from the compression convergence point to the point to be determined, which vector (called as a color gamut vector) connects the compression convergence point to an intersection point at which the vector intersects with the surface of the color gamut is calculated and the length of the source vector is compared with the length of the color gamut vector. When the length of the source vector is longer than the length of the color gamut vector, the point to be determined is determined as being out of the color gamut. When the length of the source vector is shorter than the length of the color gamut vector, the point to be determined is determined as being within the color gamut.

The above described processing for determining whether the point exists within the color gamut or not determines that the point 708 is within the no-compression region. In this case, the compression processing is not performed and the same value as that of the input sRGB value is retained. On the other hand, the point 704 is determined as the one for a color not within the no-compression region and thus is subjected to the gamut compression based on the following method. That is, the point 704 is subjected to the gamut compression to be move to a point in the printer color gamut which is not within the no-compression region. More specifically, the distance X between the point 704 and the compression convergence point O is calculated. Further, points 705, 706 and 707 at the intersections of a straight line passing through the point O and the point 704 with respective the outline of the color gamut 701 in the sRGB color space, the outermost line of the printer color gamut 702, and the outline of the no-compression region 703 are found respectively, and the respective distances between the respective intersection points and the point O are calculated. In FIG. 5, the respective distances are represented by T, D, and F. Based on the relation between the distances from the compression convergence point O, the point 704 is compressed to be in the printer color gamut. The point 704 is linearly compressed to a point on the straight line passing through the point O and the point 704 so to correspond to the point at a distance that can be calculated by the following compression function (1).

$$X' = \frac{(D-F)(X-F)}{T-F} + F \quad (1)$$

It is noted that the compression function does not have to be linear as shown in the formula (1) and also may be a multi-dimensional function or a similar function according to which a position farther away from the color gamut is subjected to losing of gradation. Further, although the size of the no-compression region is about 80% of the size of the printer color gamut, the size of the no-compression region is not limited to this. When the size of the no-compression region is 100% the same as the printer color gamut, the color in the printer color gamut can be subjected to the gamut compression method according to which the color can be calorimetrically identical and colors not within the color gamut are lost.

Next, the so-called whitening and blacking processing related to embodiments of the present invention, which are performed in the correction processing/processing of Step 503 shown in FIG. 3 and will be described in detail with reference to FIG. 9 and subsequent drawings. There may be a case where a copy function is used to copy a document and the copied printing matter as a document is again copied. In order to allow such a repeated copying to realize a favorable image reproduction, a color having a lightness equal to or higher than a specific lightness (e.g., the lightness of a white point of the printer color gamut) is mapped on the white point in the printer color gamut (white of a printing paper) (this mapping is referred to as "whitening"). Similarly, a color having a lightness equal to or lower than a specific lightness (e.g., the lightness of a black point of the printer color gamut) is mapped on the black point in the printer color gamut (this mapping is referred to as "blacking").

Figure 6:
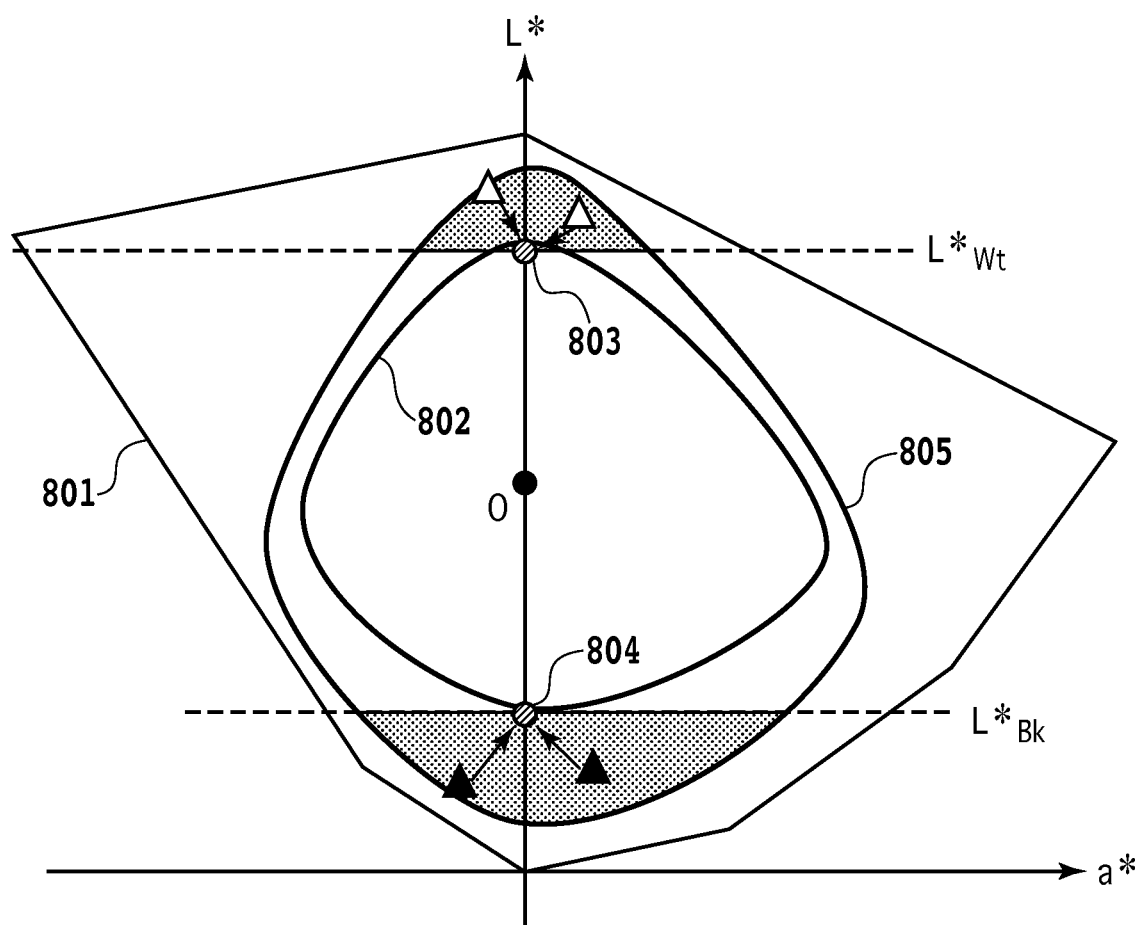
FIG. 6 is a diagram illustrating the details of whitening and blacking.

FIG. 6 is a diagram illustrating the details of the whitening and blacking in terms of movements of points (colors) in the color gamut. As described with reference to FIG. 5, a color gamut 801 and a color gamut 802 are obtained by projecting the color gamut of the sRGB color space and the printer color gamut on the L*a* plane, respectively.

The color gamut 802 is a printer color gamut when printing is performed onto a printing medium used for a copy operation. A point 803 shows a white point of the printer color gamut 802. L*Wt shows the lightness of the white point of the printer color gamut. Among points in the color gamut 801 of the sRGB color space, the grid points (colors) having the lightness equal to or higher than L*Wt is all shifted to the point 803. In this manner, the whitening is performed. On the other hand, the point 804 shows a black point of the printer color gamut and L*Bk shows the lightness of the black point of the printer color gamut. In the blacking processing, among points in the color gamut 801 of the sRGB color space, the grid point (color) having the lightness equal to or lower than L*Bk is all shifted to the point 804.

As shown in FIG. 6, when an input document has the color gamut 805 for example, the colors shown by outlined triangles in the color gamut 805 have the lightness higher than the L*Wt and thus is entirely reproduced by white of a printing medium used. The colors shown by black triangles have the lightness lower than the L*Bk and thus is reproduced by black of the printer color gamut. Hereinafter, L*Bk will be referred to as a "blacking lightness" while L*Wt will be referred to as a "whitening lightness". Although L*Bk is the lightness of the black point of the printer color gamut in this example, the present invention is not limited to this aspect. For example, an error caused when reading a document may cause the black point to be wrongly recognized as having a lighter color. These may be also taken into consideration and L*Bk may be set as a lightness that is higher than that of the black point of the printer color gamut.

Next, the color separation table used in the color separation processing of Step 506 shown in FIG. 3 will be described. When the image signals obtained by the output device color conversion (gamut mapping) of the above-described Step 505 is RGB signals, the RGB signals within the color gamut and colors specified in the calorimetric space (e.g., a CIE-L*a*b* value) have one-to-one correspondences. Thus, the color space by the RGB signal is used to specify for example 729 equally-spaced grid points. Then, color patch data corresponding to these 729 grid points is prepared and patches based on the color patch data are printed by a printing apparatus. The printed color patches are subjected to colorimetry to specify the color of the grid point represented by an RGB value unique to the printer as a color based on the CIE-L*a*b* color coordinate system for example. Next, the grid points of the sRGB color space obtained by the compression processing of Step 505 are converted to colors in the CIE-L*a*b color coordinate system, and respective grid points having the minimum color differences from the converted colors are found from the above 729 colorimetry values. Then, grid points around the point having the minimum color difference are used for an interpolating calculation to obtain printer RGB values corresponding to grid points of the sRGB color space, respectively. In the above described manner, the color separation table can be prepared that describes which ink colors of the printing apparatus are used for outputting the colors of the input color space.

Processing Unit

Figure 7A:
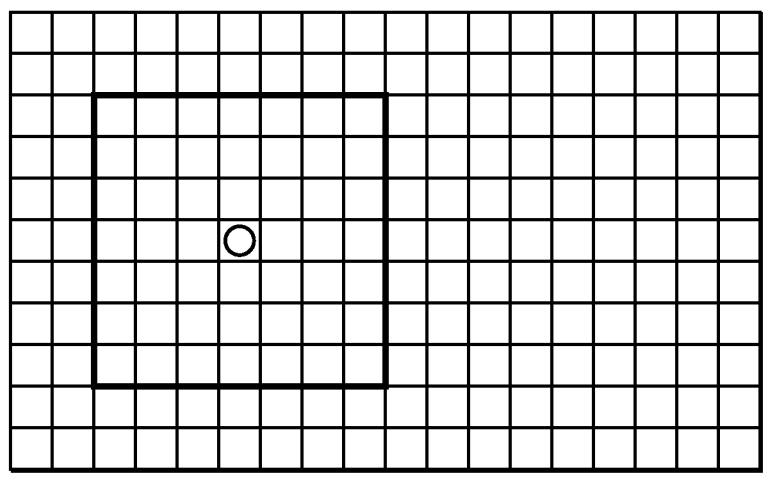
FIGS. 7A to 7C are diagrams illustrating a processing unit of the smoothing processing according to one embodiment of the present invention.
Figure 7B:
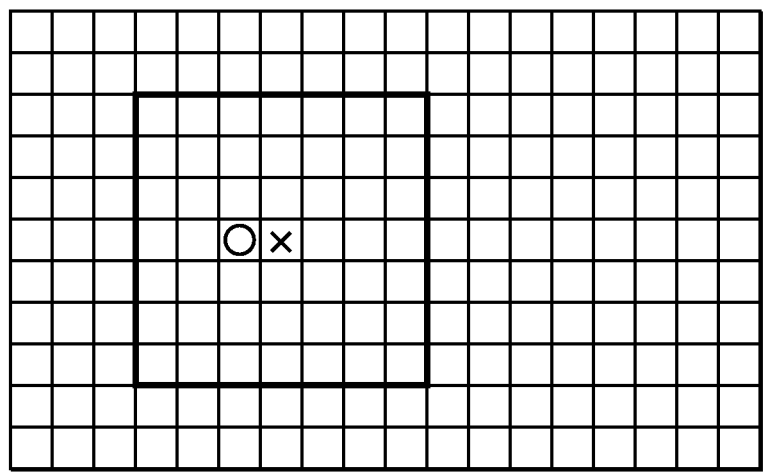
Figure 7C:
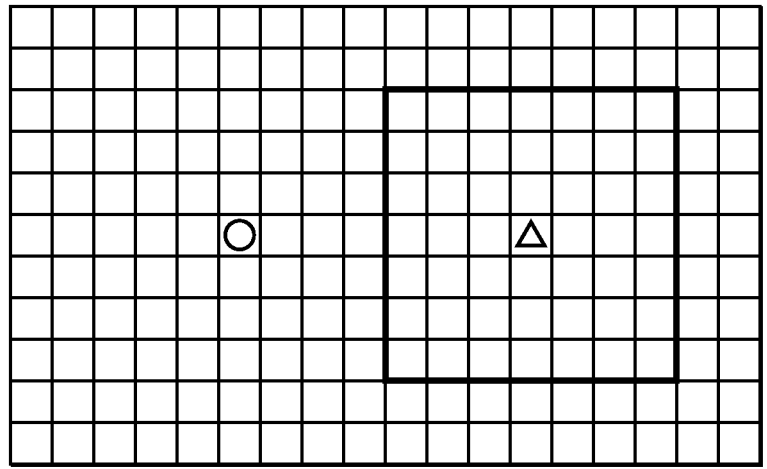

FIGS. 7A to 7C are diagrams illustrating a processing unit of the correction/processing process executed in Step 503, among the image processing shown in FIG. 3. The processing unit is particularly involved in a fourth and a fifth embodiments described later.

FIG. 7A shows a case where the processing unit corresponds to a pixel unit. In the correction/processing process, a pixel denoted by a "o" mark in FIG. 7A is set as an object pixel. Next, a region that includes the object pixel at the center, that is surrounded by the thick line, and that consists of 7×7 pixels (7×7 region) is set. Then, the image signal within the set 7×7 region is used to correct the pixel value of the object pixel.

After the processing as described above, a pixel neighboring to the object pixel such as a pixel denoted by an "x" mark in FIG. 7B for example is set as the next object pixel. Then, in the same manner as that described above, the pixel denoted by the "x" mark is assumed as the object pixel to set the 7×7 region and to execute the correction/processing process.

Thereafter, the object pixel is similarly moved by one pixel to set the 7×7 region each time for subjecting all object pixels to the correction/processing process.

When the processing unit corresponds to a region unit, the 7×7 region is set with regards to the pixel denoted by the "o" mark in FIG. 7A and the correcting strength set to the pixel denoted by the "o" mark is applied to a plurality of pixels e.g., all pixels in the 7×7 region. Then, the 7×7 region is set with regards to the pixel denoted by a "Δ" mark shown in FIG. 7C to move processing unit so that the 7×7 region for the pixel denoted by the "o" mark and the 7×7 region for the pixel denoted by the "Δ" mark are adjacent to each other. It is noted that the processing unit used as the pixel unit can set the correcting strength with a higher accuracy.

Figure 8:
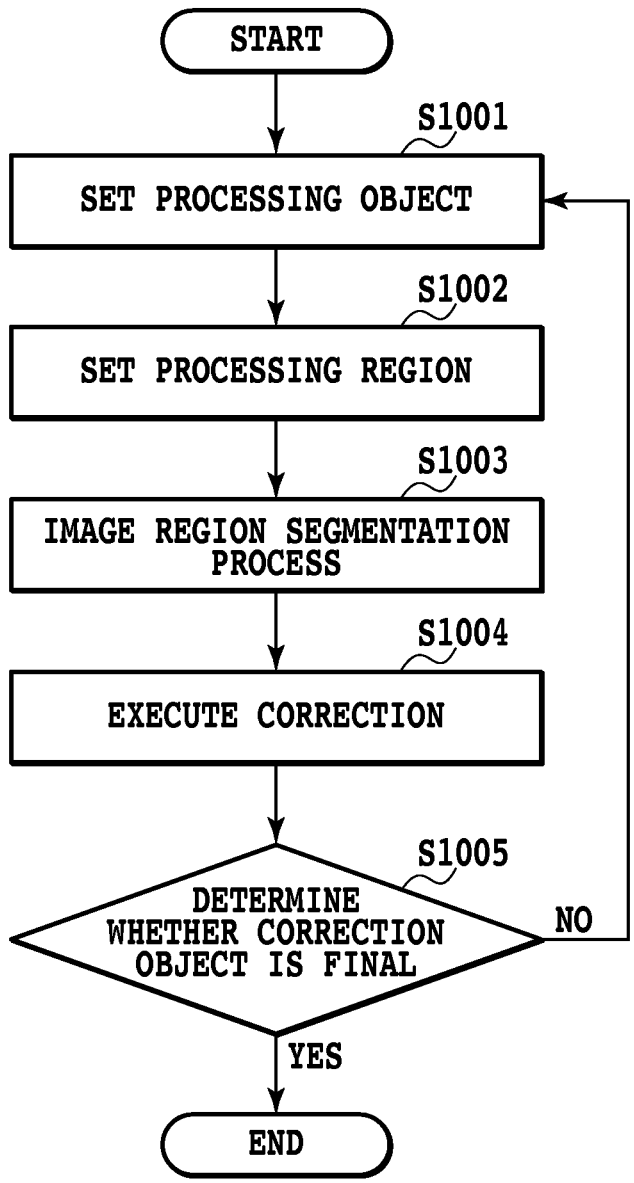
FIG. 8 is a flowchart illustrating the shift of processing unit according to the embodiment.

FIG. 8 is a flowchart illustrating the movement of the processing unit. Step 1001 sets a target to be subjected to the processing. The first processing object is set immediately after the start of this processing. When Step 1001 is returned from Step 1005, the next processing object is set. Step 1002 sets a processing region. The processing region is a region composed of a plurality of pixels including the processing unit as described above (the 7×7 region in the above example).

Step 1003 performs the image region segmentation. A region with respect to the processing unit is determined to specify region information. More specifically, this determination determines whether the region is an edge region for a character or the like or a flat region for an image or the like. Next, Step 1004 executes the processing and the correction processing based on the above determination for the region. Then, Step 1005 determines whether corrections for all processing objects are completed or not. When the corrections for the all processing objects are not completed, the processing from Step 1001 is repeated.

The following sections will describe some embodiments of a pixel value modulation and pixel value processing based on the above-described configuration of the embodiment. It is noted that, although the following sections will describe examples in which image signals are in a range from 0 to 255, the range of image signals is not limited to this and also can be appropriately set depending on the configuration of an MFP apparatus or an image processing.

Embodiment 1

Figure 9A:
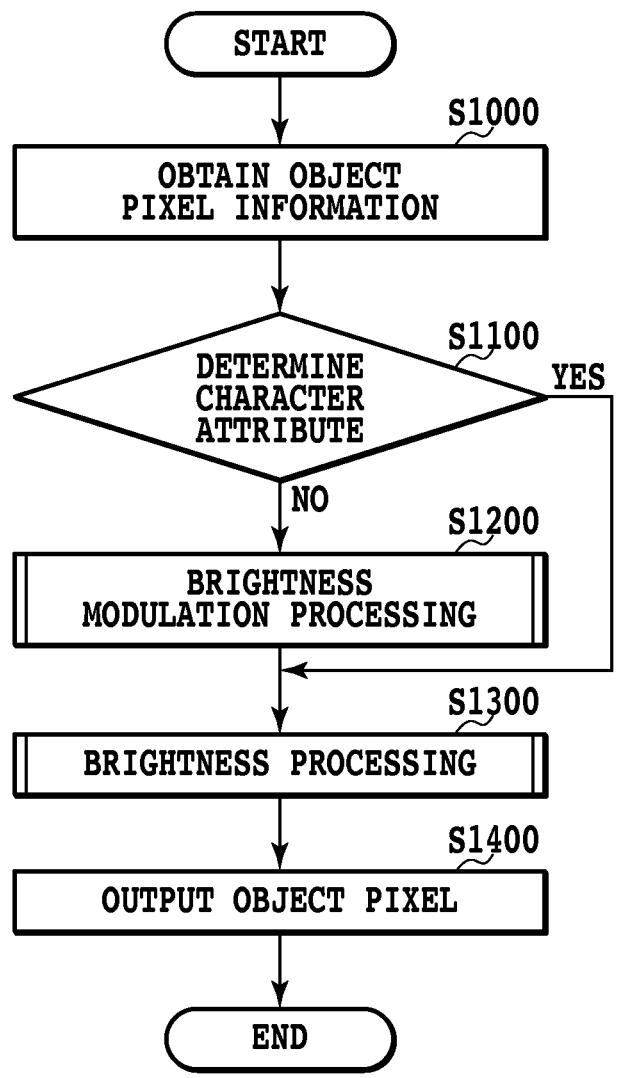
FIGS. 9A to 9C are flowcharts illustrating a correction processing and a processing according to the first embodiment of the present invention.
Figure 9B:
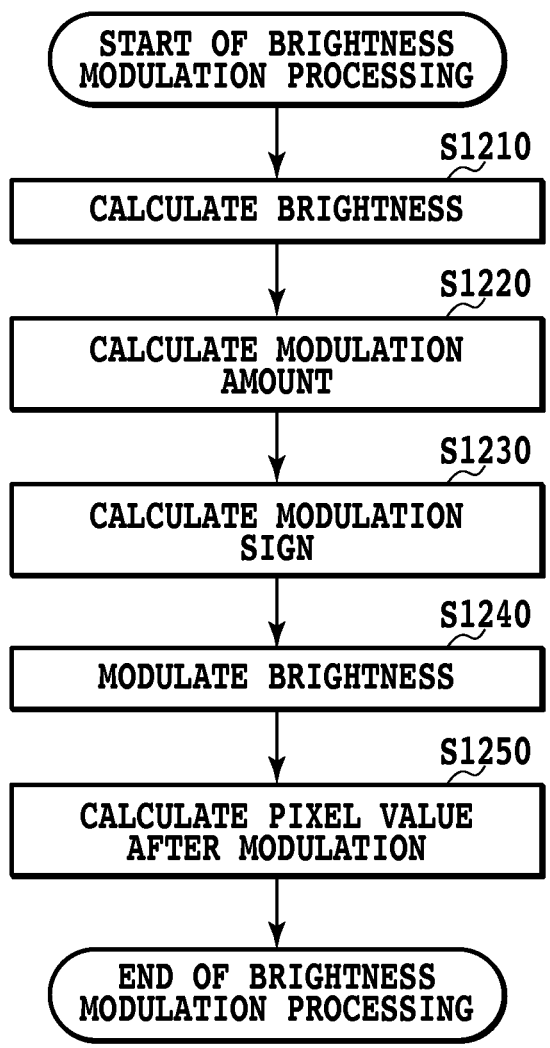
Figure 9C:
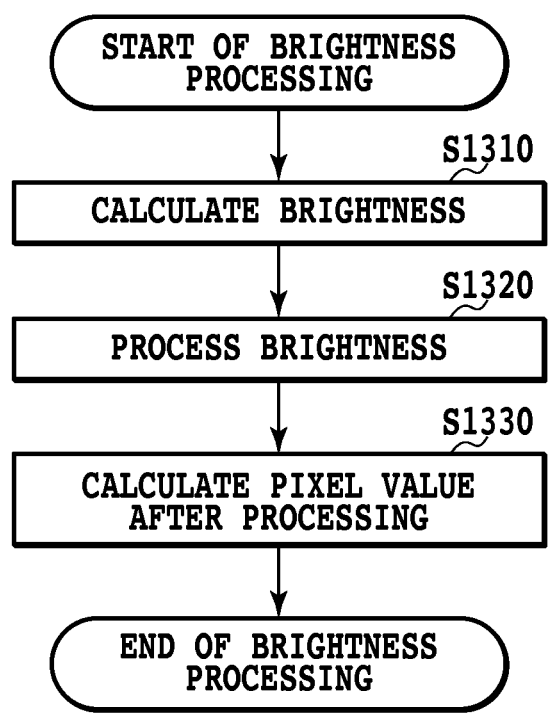

FIGS. 9A to 9C are a flowchart showing details of correction/processing (S503) according to a first embodiment of the present invention. As shown in FIG. 9A, this embodiment subjects a flat image such as a photograph image to a brightness modulation processing (S1200 of FIG. 9A) in response to executing of blacking processing as brightness processing (S1300 of FIG. 9A). This provides, without requiring individual processing configurations such as tables, favorable reproductions of a photograph image and a character image. It is noted 0 is clipped when the calculation result is below 0 and 255 is clipped when the calculation result is 256 or more unless otherwise specified.

In FIG. 9A, firstly object pixel information is obtained at Step 1000. Specifically, Step 1000 obtains an RGB signal value and a character attribute value M of an object pixel. The character attribute value M is an amount of characteristic showing whether the object pixel is a pixel constituting a character/lines (a pixel of a character region) or not. When the value M is 0, it is determined that the object pixel is a pixel constituting a natural image or a gradation image (a pixel of a photograph region). When the value M is 1, it is determined that the object pixel is a pixel constituting the character/lines.

The value M can be obtained by using known techniques such as an image segmentation and a pattern matching. Next, Step 1100 performs an image determination. Specifically, the above obtained character attribute value M of the object pixel is determined. When the value M is 0, that is, when the pixel is a pixel of the photograph region other than the character/lines, the processing proceeds to Step 1200. When the value M is 1, that is, when the pixel is a pixel of the character/line region, the processing proceeds to Step 1300.

When the object pixel is the one of the photograph region, brightness modulation processing of Step 1200 is performed. FIG. 9B is a flowchart showing details of the brightness modulation processing.

This processing firstly at Step 1210 calculates brightness for each object pixel based on RGB value that is the data of the object pixel. A brightness value Y1 is calculated by a following calculating formula.

$$Y1 = 0.299 \times R + 0.587 \times G + 0.114 \times B \qquad (2)$$

It is noted that, although this embodiment uses the brightness Y calculated by the formula (2), another value also may be used so long as the value represents the brightness component of an input pixel. For example, the value of "L" in the L*a*b* color space or the Luv color space also may be used. Furthermore, instead of directly using the brightness or lightness for example defined by these color spaces, values approximately represented for simpler calculation also may be used.

Next, Step 1220 calculates a brightness modulation amount. As described later, the brightness modulation amount is added to each pixel value as noise and is generated by Step 1220. The brightness modulation amount dY is calculated by the following calculating formula based on the above obtained brightness value Y1.

$$dY = 0 \, (Y1 \geq Ys)$$

$$dY = Yb \times (1 - Y1/Ys) \, (Y1 < Ys) \qquad (3)$$

Figure 10:
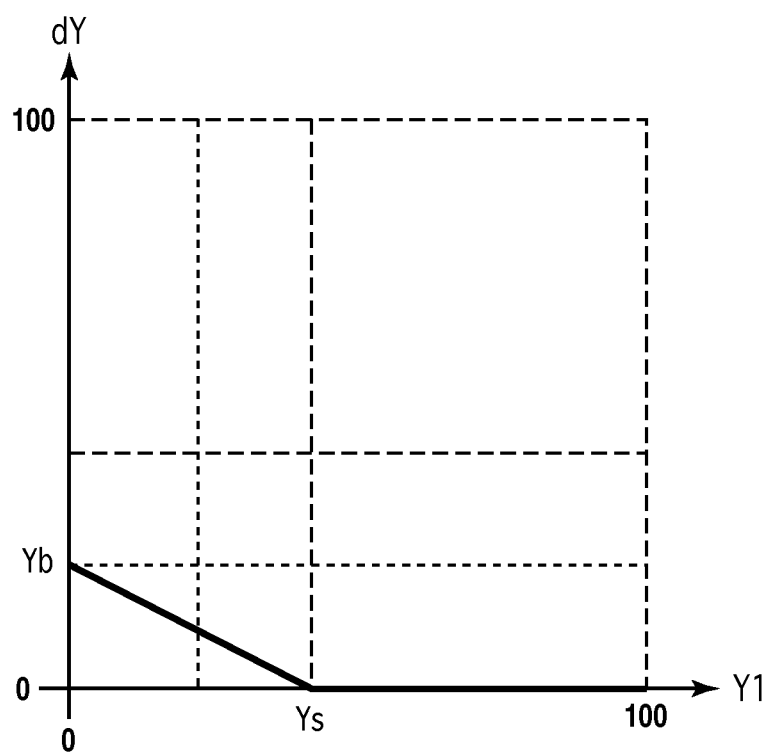
FIG. 10 is a diagram illustrating a relational expression for calculating a brightness modulation amount according to the first embodiment.

FIG. 10 is a diagram showing a relation of the formula (3). In the formula (3) and FIG. 10, a value Ys represents a value at which the brightness modulation is started in the blacking processing. Further, a value Yb represents a brightness value that is converted into the brightness 0 by the blacking processing and is the brightness obtained from an RGB value read when solid black printed by an MFP apparatus is scanned by the MFP apparatus in the embodiment. As a result, a printing result maintaining the density of the so-called solid black can be obtained in repeated copy operations.

It is noted that the respective values of Ys and Yb may be set depending on input and output characteristics of a printing apparatus for carrying out the present invention such as MFP apparatus. For example, the values Ys and Yb may be set to be high when the apparatus cannot provide stable printing density or scanned data, and a margin also may be included without directly using Ys and Yb in the formula (3) which are used in a brightness processing, which will be described later.

Figure 11:
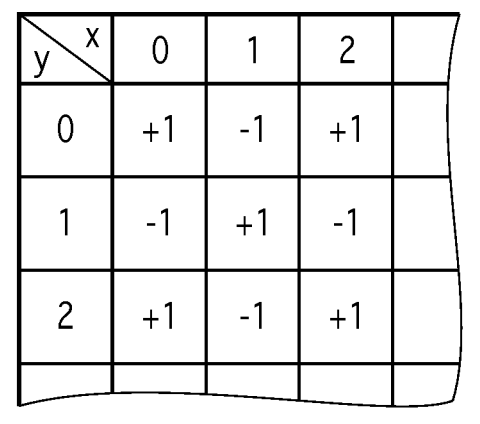

Next, Step 1230 calculates the brightness modulation sign. Specifically, Step 1230 calculates a modulation sign value F for determining whether modulation (+) in which brightness is added for each object pixel or modulation (−) in which brightness is subtracted for each object pixel is executed. In this embodiment, F=+1 is determined when the object pixel has a coordinate of "both of the coordinate x and the coordinate y are an even number" or a coordinate of "both of the coordinate x and the coordinate y are an odd number" and F=−1 is determined for cases other than the above case. As shown in FIG. 11, the determination is made alternately in which the modulation amount is positive or negative, that is, the addition or subtraction of brightness, in the respective column direction and row direction for the two-dimensional array of pixels in accordance with the position of the object pixel to be modulated.

Step 1240 modulates the brightness. Specifically, based on the above-calculated brightness modulation amount dY, brightness modulation sign F, and brightness value Y1, the following calculating formula is used to calculate a brightness Y' (8 bit) after the modulation.

$$Y' = Y1 + dY \times F/255 \qquad (4)$$

Finally, Step 1250 calculates the pixel value after the brightness modulation. Specifically, based on the above-calculated brightness Y' and the pixel value RGB used in the calculation of the brightness, the pixel value R'G'B' after the modulation is calculated based on the following calculating formula.

$$R' = Y' + 1.371 \times (0.511 \times R - 0.428 \times G - 0.083 \times B)$$

$$G' = Y' - 0.698 \times (-0.172 \times R - 0.339 \times G - 0.336 \times B)$$

$$-0.336 \times (0.511 \times R - 0.428 \times G - 0.083 \times B)$$

$$B' = Y' + 1.732 \times (-0.172 \times R - 0.339 \times G - 0.336 \times B) \qquad (5)$$

The above-described processing allows the object pixel for an image region such as a photograph to be modified so that the brightness is increased or decreased as noise in proportional to the modulation amount according to the brightness value originally owned by the pixel.

FIGS. 12A to 12D are views for explaining how a gradation image of a continuous tone is modulated relating to the blacking.

Figure 12A:
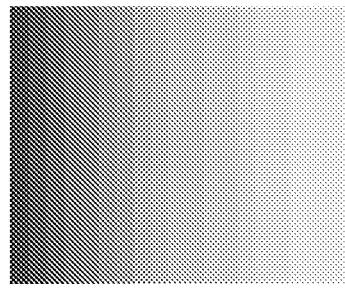
FIGS. 12A to 12D are views illustrating how to modulate a gradation image of a continuous gradation with regard to blacking.

FIG. 12A shows a gradation image before the modulation. From left to right in FIG. 12A, a gradation from black to gray is formed. When the gradation image of FIG. 12A is subjected to the modulation processing according to this embodiment, an image shown in FIG. 12C is obtained. Since a bright region not a blacking region has a modulation amount of zero, the tone shown in FIG. 12A is maintained without change. However, pixels of a blacking region are subjected to the modulation and respective pixels brighter and darker than the original pixel values are alternately arranged to form a checkered pattern. The pixels brighter than the original pixel values have brightness that is brighter than the brightness Yb that is completely lost by the blacking and thus can retain the original gradation even when being subjected to the blacking.

It is noted that the above-described processing has clipped each signal value lower than 0 or 255 or more. This may cause a case where the total sums of the brightness of the entire image may change before and after the modulation. Specifically, a case may be caused where a negative brightness of a dark part after the modulation is clipped to zero. Although this negative brightness may be directly used if the conservation of the total sum of the brightness is not required, the following procedure may be added if the conservation of the brightness is required. Specifically, a value corresponding to a part cut of when the brightness is clipped may be retained and this value may be added to another pixel when another pixel is subjected to the modulation processing. As a result, when correction/processing is carried out in which an apparatus embodies the present invention carries out the brightness modulation processing and subsequently takes a brightness histogram regarding the image for example to use the average value to perform some processing for example, the present invention can be prevented from having an influence on the correction/processing result. If the conservation of the brightness is not required, the modulation sign value F also may be always positive. In this case, the formula for calculating dY may be used before and after the modulation so that the magnitude relation for Y' of each pixel retains the original magnitude relation.

With reference to FIG. 9A again, after the brightness modulation processing, Step 1300 subjects the object pixel to brightness processing. FIG. 9C is a flowchart illustrating details of the brightness processing.

In FIG. 9C, firstly Step 13 calculates the brightness based on the RGB value after the brightness modulation by Step 1200. Specifically, based on the pixel value R'G'B' calculated in Step 1200, the brightness Y2 is calculated based on the following calculating formula.

$$Y2=0.299\times R'+0.587\times G'+0.114\times B' \quad (6)$$

It is noted that, if the conservation of the pixel value R'G'B' after the modulation as information is not required, Step 1240 may be omitted and Y' may be directly used to establish Y2=Y'.

Next, Step 1320 performs brightness blacking. Specifically, based on the above-calculated brightness Y2, the brightness Y'' by the blacking processing is calculated by the following calculating formula.

$$Y''=f(Y2) \quad (7)$$

Figure 13:
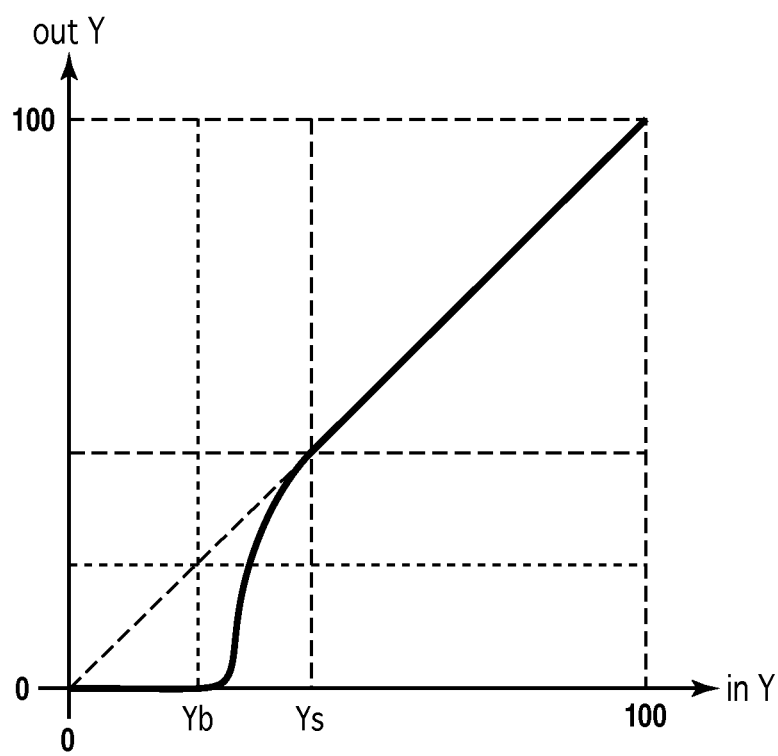
FIG. 13 is a diagram showing a one-dimensional lookup table for calculating the brightness Y" by the blacking processing according to the first embodiment.

In the formula, f(y) is a function that changes depending on the input brightness y. In this embodiment, f(y) is realized using the one-dimensional lookup table shown in FIG. 13. The blacking processing can be used to always provide a favorable black image even through repeated copying operations and can provide color reproduction having clear black characters.

It is noted that this lookup table also may be used to carry out another brightness processing. For example, a high brightness part also may be saturated to simultaneously carry out the so-called base color losing processing.

After the above brightness processing, Step 1330 calculates the pixel value after the brightness blacking processing. Specifically, based on the above-calculated Y'' and RGB value, the pixel value R'''G'''B''' after the blacking processing is calculated by the following calculating formula.

$$R'''=Y''+1.371\times(0.511\times R-0.428\times G-0.083\times B)$$

$$G'''=Y''-0.698\times(-0.172\times R-0.339\times G-0.336\times B)$$

$$-0.336\times(0.511\times R-0.428\times G-0.083\times B)$$

$$B'''=Y''+1.732\times(-0.172\times R-0.339\times G-0.336\times B) \quad (8)$$

According to the above-described processing of this embodiment, the pixel of object pixels that should be subjected to the blacking in the image of a photograph region is converted by the brightness modulation processing (S1200) into any of "a pixel having a brightness subjected to the blacking" and "a pixel having a brightness other than the one to be subjected to the blacking". Specifically, the modulation by the addition of noise converts some of pixels having a pixel value originally to be subjected to the blacking (pixels in a predetermined range) to a pixel having a brightness other than the one to be subjected to the blacking. As a result, the "pixel having a brightness other than the one to be subjected to the blacking" thus converted has an unchanged brightness in the blacking processing (S1300). This can provide an existence of a pixel in the photograph image region which is not subjected to the blacking processing. Thus, even when a photograph region is similarly subjected to the blacking processing set for a character/line region (S1300), the effect thereof can be reduced.

Figure 12B:
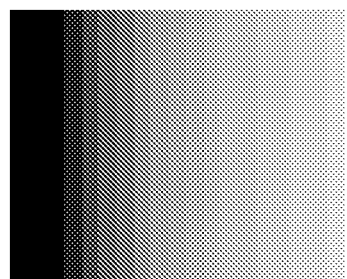
Figure 12C:
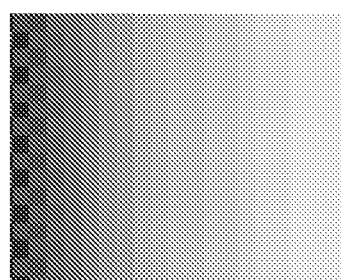

FIG. 12B shown above shows an image when the original image shown in FIG. 12A is subjected to the blacking processing without carrying out the brightness modulation processing of this embodiment. In this case, the blacking processing loses the gradation of the dark part to cause a few left lines to constitute a totally-black image.

Figure 12D:
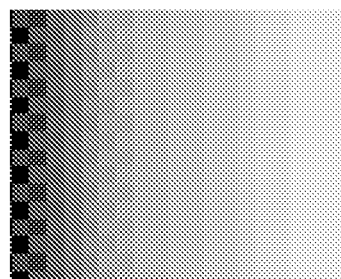

On the other hand, FIG. 12D shows an image obtained when the image as shown in FIG. 12C, which is obtained by changing the original image shown in FIG. 12A by executing the brightness modulation processing of this embodiment, is subjected to the blacking processing. As described above, this image includes, even in the dark part, pixels having "a brightness other than those to be subjected to the blacking" arranged with a fixed interval. Thus, even after the blacking, the gradation by these pixels remains to prevent the losing of gradation as shown in FIG. 12B.

Although the above embodiment has carried out the pixel value modulation (brightness modulation) and the pixel value processing (brightness processing) in succession, another processing also may be carried out between the two processings so long as the meaning of the given modulation is not deteriorated. This also applies to other embodiments described below.

Although the above embodiment has provided the character attribute value M of binary information of 0 or 1, this also may be multivalued information based on the likelihood of characters. For example, M is represented by 8 bit and M=0 completely corresponds to a pixel in a photograph region and M=255 completely corresponds to a pixel in a character region. A signal value between the former and the latter is determined depending on the possibility where the pixel is a pixel of a character region. In this case, different results may be used depending on whether or not Step 1100 of character attribute determination results in M that is equal to or lower than an arbitrary threshold value. In this case, branching in Step 1100 is not always required and the calculation of the modulation amount in Step 1220 may calculate an optimal modulation amount dY depending on M.

Specifically, the above-described formula (3) may be changed in the following manner for example.

$$dY=0(Y1\geq Ys)$$

$$dY=Yb\times(1-Y1/Ys)\times(255-M)(Y1<Ys) \quad (9)$$

As described above, M having a large value corresponds to a high possibility where the pixel is the one in a character region and thus a small modulation amount is set and M having a small value corresponds to a high possibility where the pixel is the one in a photograph region and thus a high modulation amount is set. In the manner as described above, in addition to the effect described in this embodiment, the switching of regions in the image can be less recognized to improve the image quality. This also applies to other embodiments described below.

Embodiment 2

In the above-described first embodiment, the processings of Steps 1220 to 1240 perform the pixel value modulation. Since this method determines the direction of a modulation amount based on the position of a pixel, a region subjected to the modulation is modulated to include light and dark pixels arranged in a checkered pattern. The regularly-changed light and dark pixels may result, depending on the output resolution of a printing apparatus, in a pattern in the output, which may deteriorate the image quality. Furthermore, when the inputted image is of the halftone dot printing for example, the space frequency characteristic owned by the image itself may interfere with the space frequency characteristic owned by the checkered pattern-like modulation in the above embodiment to cause moiré. This embodiment relates to a method for remedying this problem.

Figure 14A:
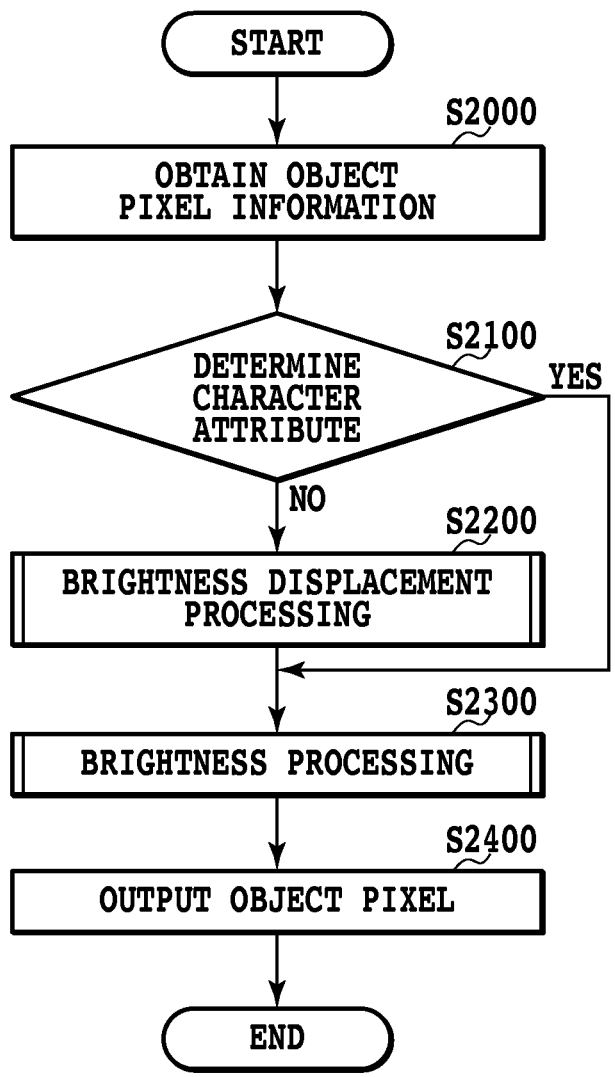
FIGS. 14A to 14C are flowcharts showing the details of an image processing and a compensation processing according to the second embodiment of the present invention.
Figure 14B:
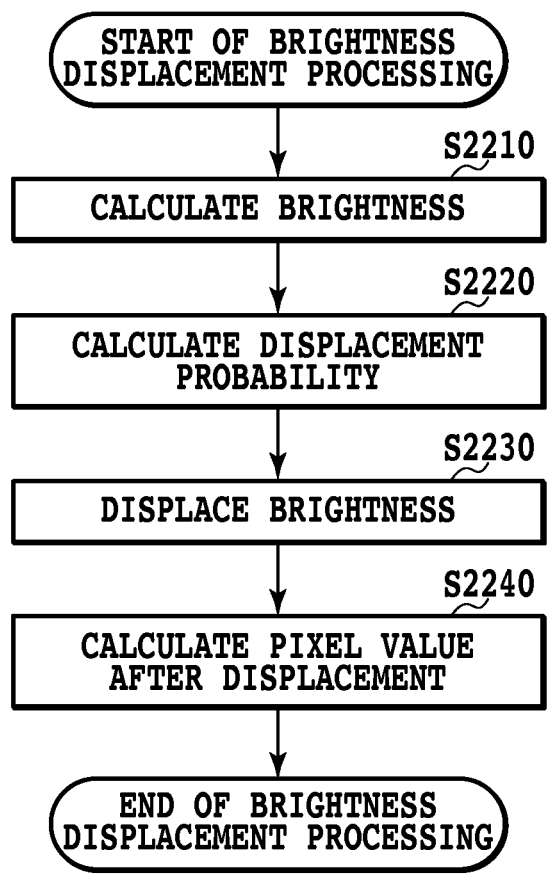
Figure 14C:
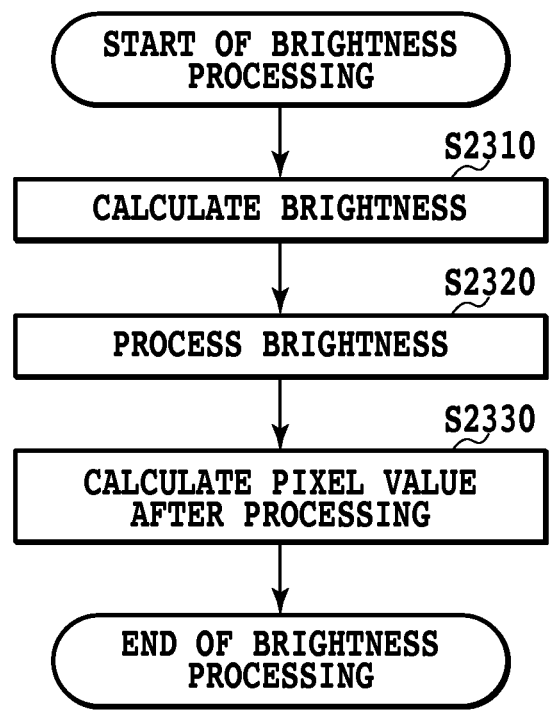

FIGS. 14A to 14C are flowcharts illustrating correction/processing according to a second embodiment of the present invention. In FIGS. 14A to 14C, the processings of Steps 2000 to 2210 and Steps 2240 to 2400 are the same as those of the above-described Steps 1000 to 1210 and Steps 1250 to 1400 and thus will not be described further.

In this embodiment, the brightness displacement processing (S2200 of FIG. 14A) is performed to modulate the brightness so that the modulation has irregularity.

In FIG. 14B showing details of the brightness displacement processing, Step 2220 is a processing for calculating a displacement probability. Specifically, a brightness displacement possibility pY is calculated based on brightness Y1 through the following calculating formula.

$$pY=0 (Ys \leq Y1)$$

$$pY=(pYmax/(Ys-Yb))(Ys-Y1)(Yb<Y1 \leq Ys)$$

$$pY=(pYmax/Yb) \times Y1 (0 \leq Y1) \quad (10)$$

Figure 15:
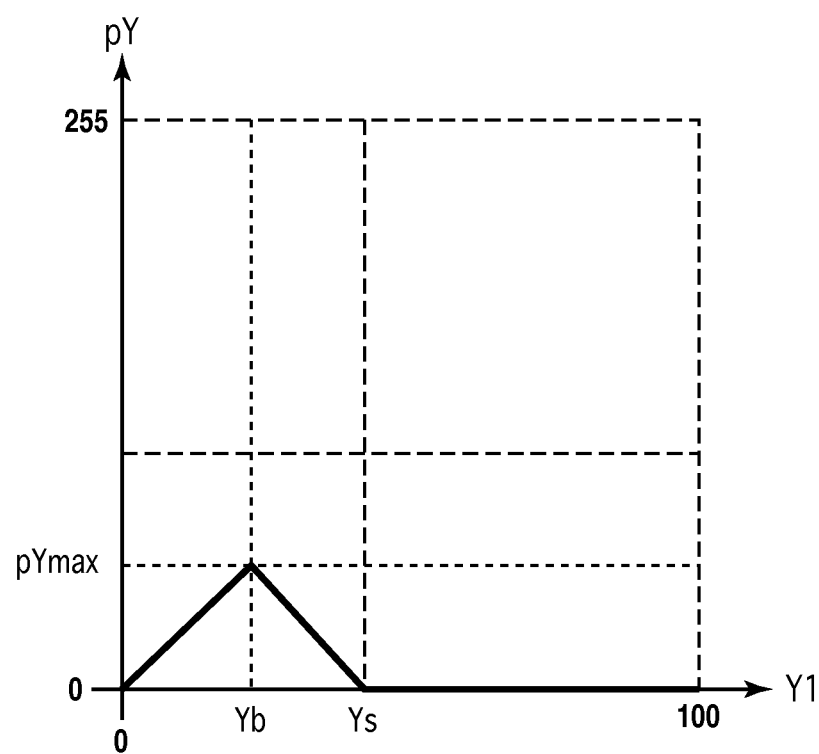
FIG. 15 is a diagram illustrating a relation between a displacement possibility pY and a brightness Y1 according to the second embodiment.

In this formula, pY represents the displacement possibility and pY of 0 shows the probability of zero and pY of 255 shows the probability of 1. pYMax is set in consideration of to which extent gradation in the vicinity of black should be left in the photograph gradation. It is noted that the respective values can be set depending on the input/output characteristic of the MFP apparatus for carrying out this processing. Alternatively, as described in the first embodiment, Ys and Yb set in the blacking processing also may be set with an arbitrary margin. FIG. 15 shows a relation between the above pY and Y1.

Next, Step 2230 performs the brightness displacement. Specifically, based on the above-calculated pY and Y1, the following calculating formula is used to calculate the brightness Y' after the displacement processing. First, a random number generator is used to randomly generate values from 1 to 255. When the generated value is equal to or lower than pY, the brightness of the object pixel is displaced based on the following formula.

$$Y'=eY \quad (11)$$

In the formula, eY shows the displacement brightness and eY=Ys is established in this embodiment.

When the generated value exceeds pY, the brightness Y1 of the object pixel is directly used without change.

$$Y'=Y1 \quad (12)$$

According to this embodiment as described above, the following effect is obtained in addition to the effect by the first embodiment. Specifically, the modulation can be performed irregularly to suppress the regular change of pixels by the modulation from being outputted as a pattern. Furthermore, moire also can be suppressed that is caused by the interference between the spatial frequency characteristic during the modulation and the spatial frequency characteristic owned by the document of a halftone dot printed matter for example.

Although this embodiment has used the displacement brightness eY equal to YS, the value eY may be another value so long as the value is not a values (0 to Yb) processed to have zero brightness by the brightness processing in Step 2310. For example, the displacement brightness eY may be set to a value lower than Ys to reduce the change of the pixel value before and after the displacement. Thus, the displaced pixel can be less recognized on the image. In this case, pY and eY may be adjusted together to provide the effect of this embodiment. The modulation amount also may be determined by a random number or the modulation sign F also may be determined by a random number.

Embodiment 3

Although the first and second embodiments described above have described a case where the blacking processing is performed as pixel value processing, this embodiment will be described based on the application of the present invention to a case where a high chroma part is subjected to a chroma enhancement processing.

When considering the design of an output color when color characters are outputted through a copy operation, it is desirable to make characters in the high chroma part to be crisp and clear. To realize this, it is effective to increase chroma components in a pixel of a high chroma to enhance chroma. On the other hand, the chroma enhancement is effective in improving the appearance of a natural image. However, a natural image subjected to extreme chroma enhancement as in characters results in the lost gradation of the high chroma part. To prevent this, chroma processing needs to be performed by which color characters in a character/line region in the document are enhanced to be crisp and clear and by which an improved appearance while maintaining the continuous tone is realized in the other regions. However, configurations in which processing tables are provided to the respective regions or these processing tables are switched and used in accordance with the pixel attribute of an object pixel may be difficulty realized due to an operation speed or a memory efficiency.

This embodiment relates to a configuration by which crisp color characters are outputted without the switching of a plurality of image processing tables and the gradation characteristic of a natural image in a high chroma region is maintained.

Figure 16A:
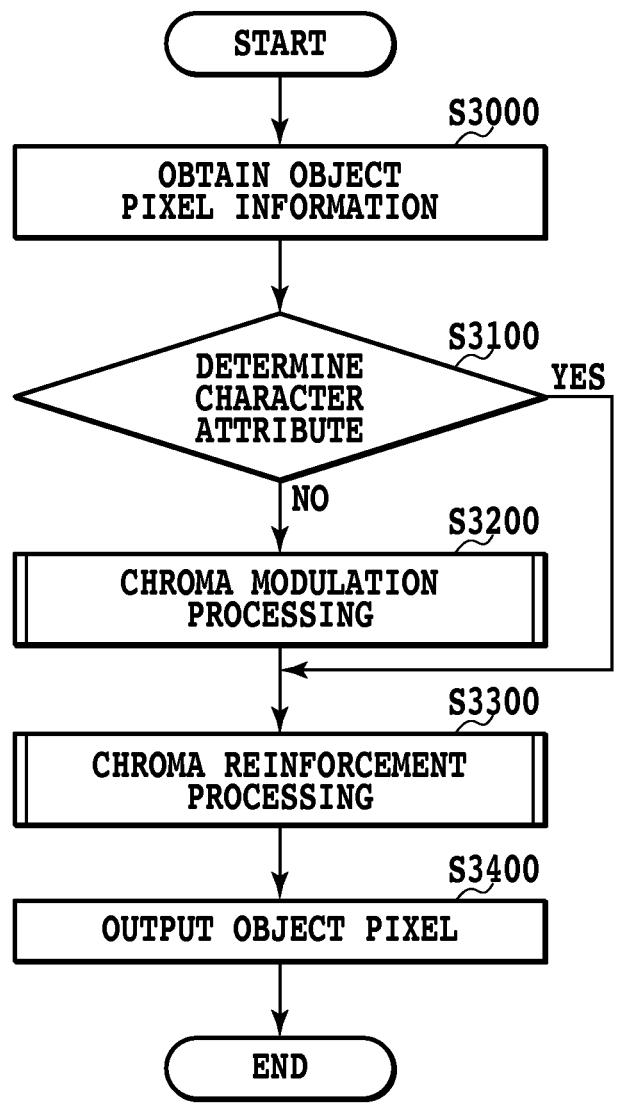
FIGS. 16A and 16B are flowcharts showing the details of a compensation processing and an image processing according to the third embodiment of the present invention.
Figure 16B:
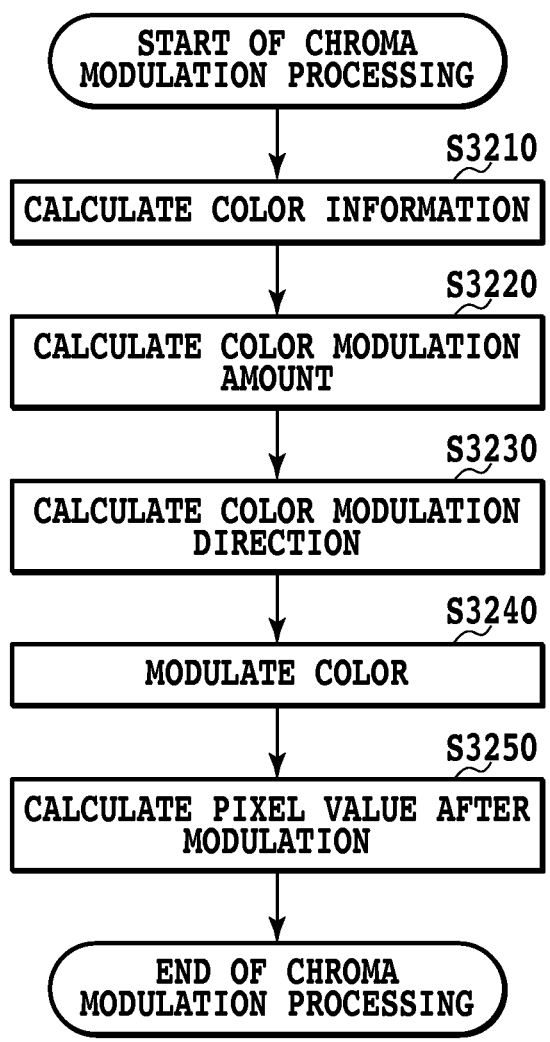

FIGS. 16A and 16B are flowcharts illustrating correction/processing according to a third embodiment of the present invention. In FIGS. 16A and 16B, Step 3000 to 3100 and Steps 3400 are the same as Steps 1000 to 1100 and Step 1400 as described above and thus will not be described further.

In this embodiment, a chroma modulation (S3200 of FIG. 16A) is performed as in the above-described brightness modulation. In FIG. 16B showing details of the chroma modulation, firstly Step 3210 is performed to calculate the color information. Specifically, based on the pixel value RGB for each object pixel, a hue H1, a chroma S1, and a lightness V1 are calculated by the following calculating formula. It is noted that the following formula uses color conversion generally used as conversion from RGB to HSV. In this formula, the maximum value of R, G, B is represented as MaxRGB and the minimum value of R, G, B is represented as MinRGB.

$$S1=(MaxRGB-MinRGB)/MaxRGB$$

$$V1=MaxRGB$$

With regards to H1, the following different cases are used for calculation depending on which signal value of R, G, B is MaxRGB.

When MaxRGB is a signal value R:

$$H1=60 \times (G-B)/(MaxRGB-MinRGB)+0$$

When MaxRGB is a signal value G:

$$H1=60 \times (B-R)/(MaxRGB-MinRGB)+120$$

When MaxRGB is a signal value B:

$$H1=60\times(G-B)/(\text{Max}RGB-\text{Min}RGB)+240 \quad (12)$$

Although the above example uses H1 and S1 as calculated in the formula (12), another value may be used so long as the value represents a color component and a vividness component of an input pixel. For example, a hue or chroma in the L*a*b* color space or the Luv color space may be used. Further, instead of using the formula defined by these color spaces, the one approximately represented for simpler calculation may be used.

Next, Step 3220 calculates a color modulation amount. Specifically, based on the above-calculated S1, the color modulation amount dS is calculated by the following calculating formula.

$$dS=0 (S<Ss)$$

$$dS=(dS\text{Max}/(255-Ss))\times(S1-Ss)(S\geq Ss) \quad (13)$$

In the formula, dSMax represents the maximum modulation amount and Ss represents the chroma modulation threshold value. In this embodiment, in the chroma enhancement performed by the subsequent Step, the minimum chroma to be subjected to the chroma enhancement is obtained for each hue of the respective hues of the respective colors of R, G, B, C, M, Y and an average value of the minimum chromas is used as Ss. The value of dSMax is set so as to prevent an inversion of the chroma magnitude relation before and after the color modulation in a range not exceeding 255-Ss so that the value is suitable for the balance between the gray scale reproduction and the chroma enhancement of a photograph image.

It is noted that the respective values may be arbitrarily set depending on the input/output characteristic of an MFP apparatus embodying the present invention. For example, dSMax may be set to be high with a margin for an apparatus that cannot provide stable printing density or scan data. Alternatively, as described in the above step, dSMax may be set based on the chroma in the L*a*b* color space or the Luv color space. When different chroma enhancements are used for the respective colors, the chroma enhancement amount at the color corresponding to H calculated in the above step and the minimum chroma to be subjected to the chroma enhancement may be calculated to change dSMax and Ss depending on H.

Figure 17:
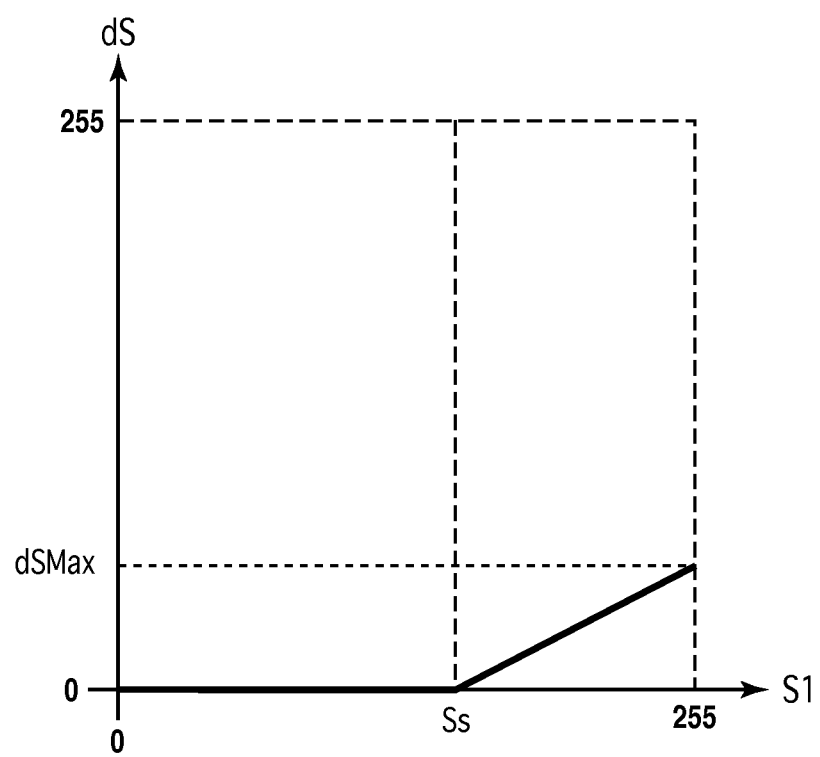
FIG. 17 is a diagram showing a relational expression for calculating a chroma modulation amount according to the third embodiment.

FIG. 17 is a diagram illustrating a relation between the above dS and S1.

Next, Step 3230 calculates a color modulation direction. Specifically, a modulation sign value F is calculated that is used to switch whether the object pixel is subjected to the modulation for adding chroma or the modulation for subtracting chroma. The modulation sign value F is F=+1 when the object pixel has a coordinate of "both of the coordinate x and the coordinate y are an even number" or a coordinate of "both of the coordinate x and the coordinate y are an odd number" and is F=−1 determined for cases other than the above case.

Next, Step 3249 performs the color modulation. Specifically, based on the above-calculated S1, F and dS, the chroma S2 after the modulation is calculated.

$$S2=S1+F\times dS$$

Finally, Step 3250 calculates the pixel value after the modulation. Specifically, based on the above-calculated H1, V1, and S2, the pixel values R2, G2, and B2 after the modulation is calculated. When S2=0, the following is established.

$$R2=G2=B2=V1$$

When S2>0, a following formulae are used for calculation. It is noted that the following formulae use color conversion generally used as conversion from HSV to RGB. "int(x)" in the formulae represents a value obtained by rounding off a fractional part of x.

$$i=int(H1/60)$$

$$f=H1-(i\times 60)$$

$$p1=V1\times(1-S2)$$

$$p2=V1\times(1-S2\times f)$$

$$p3=V1\times(1-S2\times(1-f))$$

$$R2=V1, G2=p3, B2=p1 (i=0)$$

$$R2=p2, G2=V1, B2=p1 (i=1)$$

$$R2=p1, G2=V1, B2=p3 (i=2)$$

$$R2=p1, G2=p2, B2=V1 (i=3)$$

$$R2=p3, G2=p1, B2=V1 (i=4)$$

$$R2=V1, G2=p1, B2=p2 (i=5)$$

As described above in the above Steps, when the modulation is performed based on the chroma in the L*a*b color space or the Luv color space, an inverse conversion may be performed from each color space to RGB so as to correspond to this.

With reference to FIG. 16A again, after the above-described chroma modulation processing (S3200), Step 3300 performs a chroma enhancement based on pixel values R2, G2, and B2 after the modulation. Here, the chroma enhancement processing with the enhancement amount suitable for characters/lines is retained as a three-dimensional lookup table information and the chroma enhancement is carried out by referring to the table.

In the chroma enhancement, respective pixels of an image in a photograph region to be subjected to the chroma enhancement are converted by the modulation processing of this embodiment to any of "a pixel to be subjected to the chroma enhancement" and "a pixel not to be subjected to the chroma enhancement". Thus, "a pixel not to be subjected to the chroma enhancement" obtained by the modulation has no change in chroma in the chroma enhancement processing. This makes the pixel of the photograph image exist, which is not to be subjected to the chroma enhancement. As a result, when the chroma enhancement processing is applied to the photograph image region similarly to the character/line region, the effect of the chroma enhancement processing to the photograph image region can be reduced.

According to the above embodiment, the following effect is obtained in addition to the effect of the first embodiment. Specifically, crisp color characters can be outputted without switching a plurality of image processing tables and the gradation characteristic in a high chroma region of a natural image can be favorably maintained.

Although this embodiment has described an example in which the chroma enhancement amount is controlled, the control of the blacking amount in the first embodiment and the second embodiment may be carried out together. In this case, the modulation direction can be represented as a vector of a combination of the brightness direction and the hue direction. In other words, depending on the three-dimensional position on a color space determined based on the RGB signal values owned by the object pixel, the signal values may be controlled to have a directionality in an appropriate direction to carry out modulation with an appropriate amount.

When an optimal processing or color conversion is used for a character/line region, a pixel determined as the one in a photograph region can be subjected to a pixel value modulation in a direction along which the effect of this processing is reduced, thereby performing the processing with an appropriate strength for each region.

Embodiment 4

In the above-described first to third embodiments, examples are described in which an object pixel value is modulated based on the pixel information for each object pixel. However, depending on an accuracy of the character/photograph determination of an image segmentation result for example, a pixel determined as the one in a character/line region may be caused as a singularity in a photograph. In this case, this pixel is not subjected to the pixel value modulation.

Although the above embodiments describe cases where when the conservation of a gradation is desired before and after the modulation, the method for retaining a clipped brightness is described as a modification of the first embodiment. A case that cannot be solved by this method may be a case as described below. Specifically, when a document is composed of pixels of the area coverage modulation such as newspaper advertisement, only considering a single pixel may results in a case where only a part having a halftone dot image is subjected to the pixel value modulation. When the halftone dot image is printed with relatively thick ink in this case, a case may be considered where brightness sufficient for modulating the brightness to be darker is not left. This cannot be solved if a pixel to be subjected to the modulation is only those corresponding to thick ink of halftone dots. As a result, the brightness of the entire document cannot be conserved during the modulation.

Also, when such the modulation amount or the modulation direction to a single pixel is determined based on a random number or a pixel coordinate, a region such as the one corresponding to the entire page to be printed that is composed of a sufficiently large number of pixels results in the total sum of modulation of zero. Before and after the modulation, the total sum of signal values such as brightness or chroma of an original image is conserved. However, when an image region to be subjected to the modulation is composed of a small number of pixels, the probability at which the total sum of signal values is conserved is reduced to the similar extent.

This embodiment relates to a method for improving them. This embodiment performs a modulation depending on the distribution of pixel values in image data.

Figure 18A:
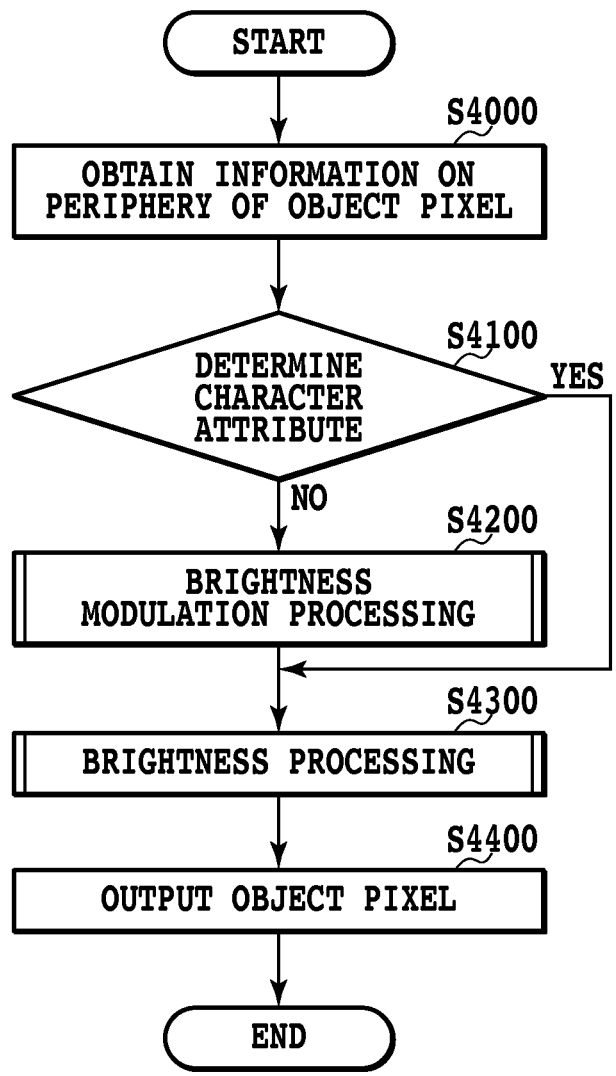
FIGS. 18A to 18C are flowcharts illustrating a correction processing and a processing according to a fourth embodiment of the present invention.
Figure 18B:
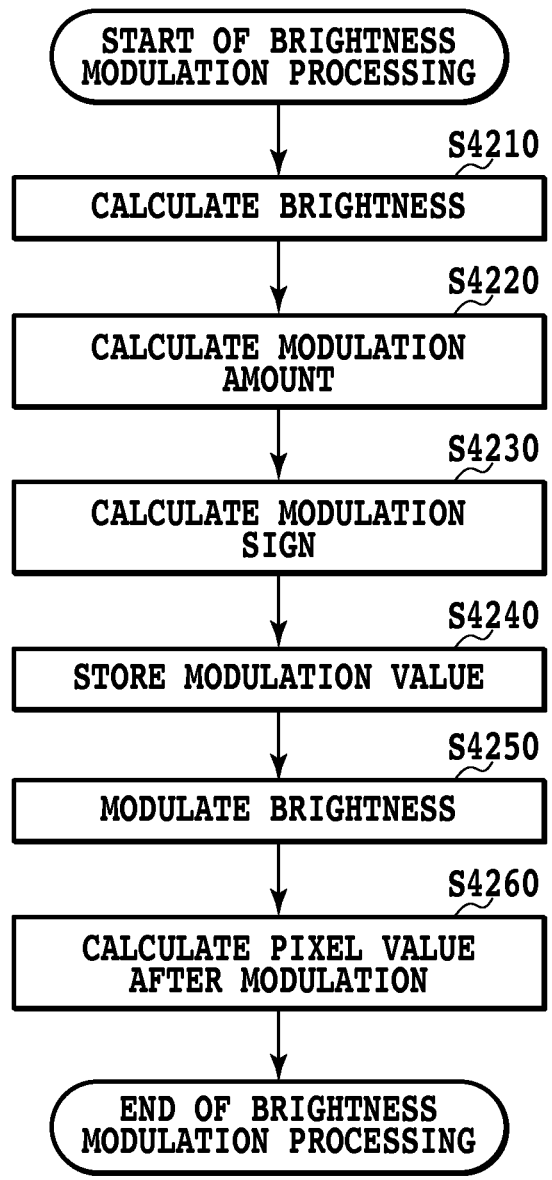
Figure 18C:
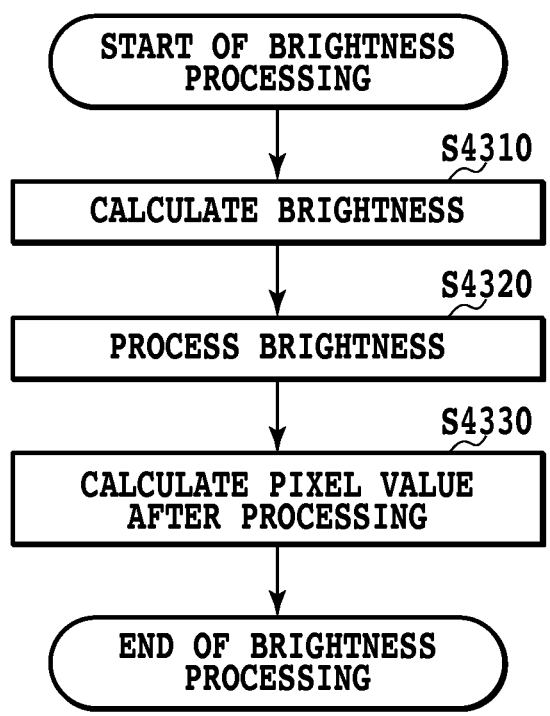

FIGS. 18A to 18C are flowcharts illustrating processing/correction processing according to a fourth embodiment of the present invention. In FIGS. 18A to 18C, the processing of Steps 4100 to 4220 and Steps 4250 to 4400 are the same as those of the above-described Steps 1000 to 1220 and Steps 1240 to 1400 and thus will not be described further.

In FIG. 18A, Step 4000 obtains periphery information of an object pixel. Specifically, a processing region composed of 7 lateral pixels×7 longitudinal pixels around an object pixel is set. Based on the respective pixel values of this processing region, the brightness Y is calculated according to a formula (14).

$$Y=0.299 \times R+0.587 \times G+0.114 \times B \quad (14)$$

Then, an average of Y calculated for respective pixels in the region of 7 pixels×7 pixels is used as a brightness value Y1 of the object pixel. An average of an attribute value M calculated for the respective 7 pixels×7 pixels is used as a pixel attribute value M' of the object pixel. Here, a weighted average may be calculated by weighting the neighborhood of the object pixel for the respective pixel values of 7 pixels×7 pixels so that M' and Y1 of the object pixel may be calculated while putting more importance on M and Y at the object pixel and the neighborhood thereof.

Step 4230 in FIG. 18B calculates a modulation sign. In this calculation, a processing region of lateral 4 pixels×longitudinal 4 pixels around the object pixel is set to calculate, with regards to the respective pixel values of the processing region, a modulation sign value F for switching between a modulation for adding brightness or a modulation for subtracting brightness. The modulation sign value F is F=+1 when each coordinate of the object pixel is "both of the coordinate x and the coordinate y are an even number" or "both of the coordinate x and the coordinate y are an odd number" and is F=−1 for cases other than the above case.

Then, Step 4240 stores the modulation values. Here, based on dY (which is calculated by Step 4220 as in Step 1220 in Embodiment 1), Y1, and F in each pixel in the above-described processing region, the modulation values of the respective pixels are stored. The modulation values of the respective pixels can be calculated based on the following formula.

$$dY=dY0 \, (Y1 \geq Ys)$$

$$dY=dY0+dY\mathrm{Max}/16 \times (1-Y1/Ys)(Y1 \leq Ys) \quad (15)$$

In the formula, dY0 represents a modulation value already given by the modulation for other object value. Although the above formula uniformly add the modulation amount obtained by the object pixel to each pixel, the addition also may be performed while weighting on the neighborhood of the object pixel.

According to this embodiment, in addition to the effect by the first embodiment, the following effect is obtained. Specifically, the modulation amount can be determined based on the pixel information of a plurality of pixels including the object pixel. As a result, character attribute values of the plurality of pixels can be considered to obtain, without depending on an accuracy of the image segmentation, a modulation result in which the switching of modulation in the image is less conspicuous. Furthermore, the pixel values of a plurality of pixels can be considered to secure, without depending on the characteristic of the printing form of a document, the conservation of the brightness before and after the modulation. Furthermore, pixel values of a plurality of pixels including the object pixel can be modulated to assure the conservation of the brightness before and after the modulation even in a case of an image composed by a local region in the image or an image composed of a small number of pixels.

Although this embodiment describes the modification of the first embodiment in which a plurality of pixels are inputted and modulated, the same also applies to the second and third embodiments. In the case where the second embodiment modulates a pixel value by adding a random number, in order to assure the total sum of 0 of the modulation amount by the modulation processing in one pixel of the object pixel as in this embodiment, the modulation amount of the object pixel itself for example is similarly calculated as in the second embodiment. Then, a value obtained by subtracting the modulation amount from 0 may be allocated to the remaining periphery pixels with arbitrary ratio and dispersion. The respective effects also can be obtained by providing a plurality of input or modulation pixels. Thus, this also can be arbitrarily carried out depending on the performance of the apparatus and the limitation on size. The number of pixels and a region referred by periphery pixels of an inputted pixel and the number of pixels and a region to be subjected to the modulation also can be arbitrarily set and not limited to the number of pixels described in this embodiment.

Embodiment 5

In the above first to fourth embodiments, the modulation amount has been determined based on the pixel value (or an average value thereof) and the attribute value (or an average value thereof). However, a case may be considered where the modulation amount is more preferably determined depending on whether an image including the object pixel is an area coverage modulation image or a density modulation image. For example, when a document is an area coverage modulation image obtained by the halftone dot printing for example, the gradation in a dark part or a high density part is represented by how much blank is included in a gap between dots of C, M, Y, K. Specifically, even without performing the brightness modulation processing according to the present invention, the blank part may be maintained even after the brightness processing. Thus, a case may be considered where the copy output without deterioration of the gradation is possible while maintaining a certain level of the gradation. When the invention is applied to such a document, this means that a high frequency component is newly added to a photograph image region, thus causing a case where the original image quality may be damaged.

This embodiment relates to a method for improving this.

Figure 19A:
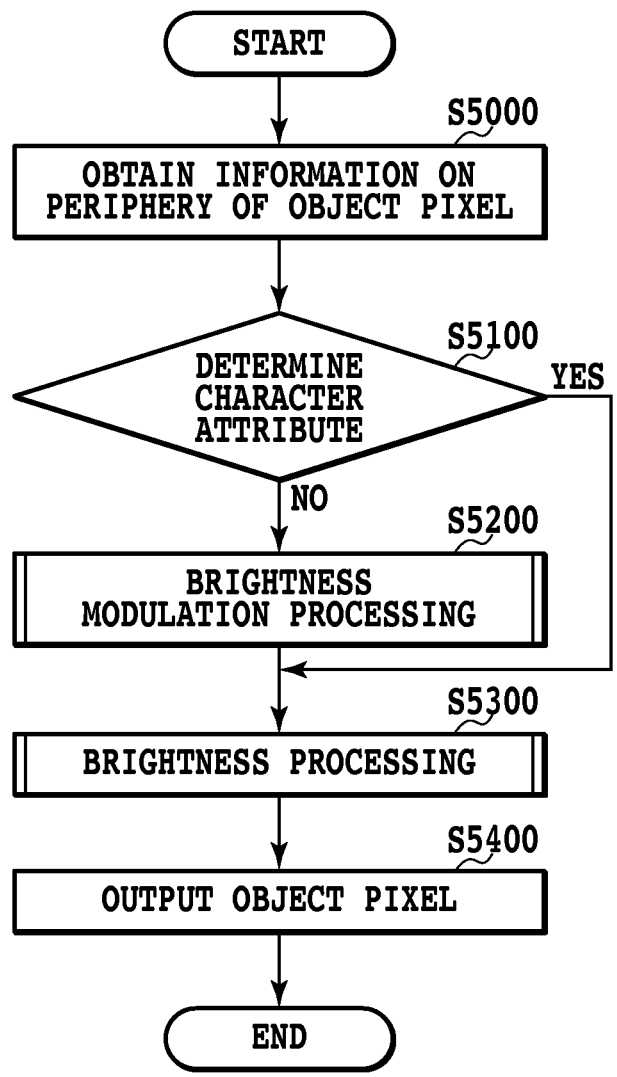
FIGS. 19A to 19C are flowcharts illustrating a correction processing and a processing according to a fifth embodiment of the present invention.
Figure 19B:
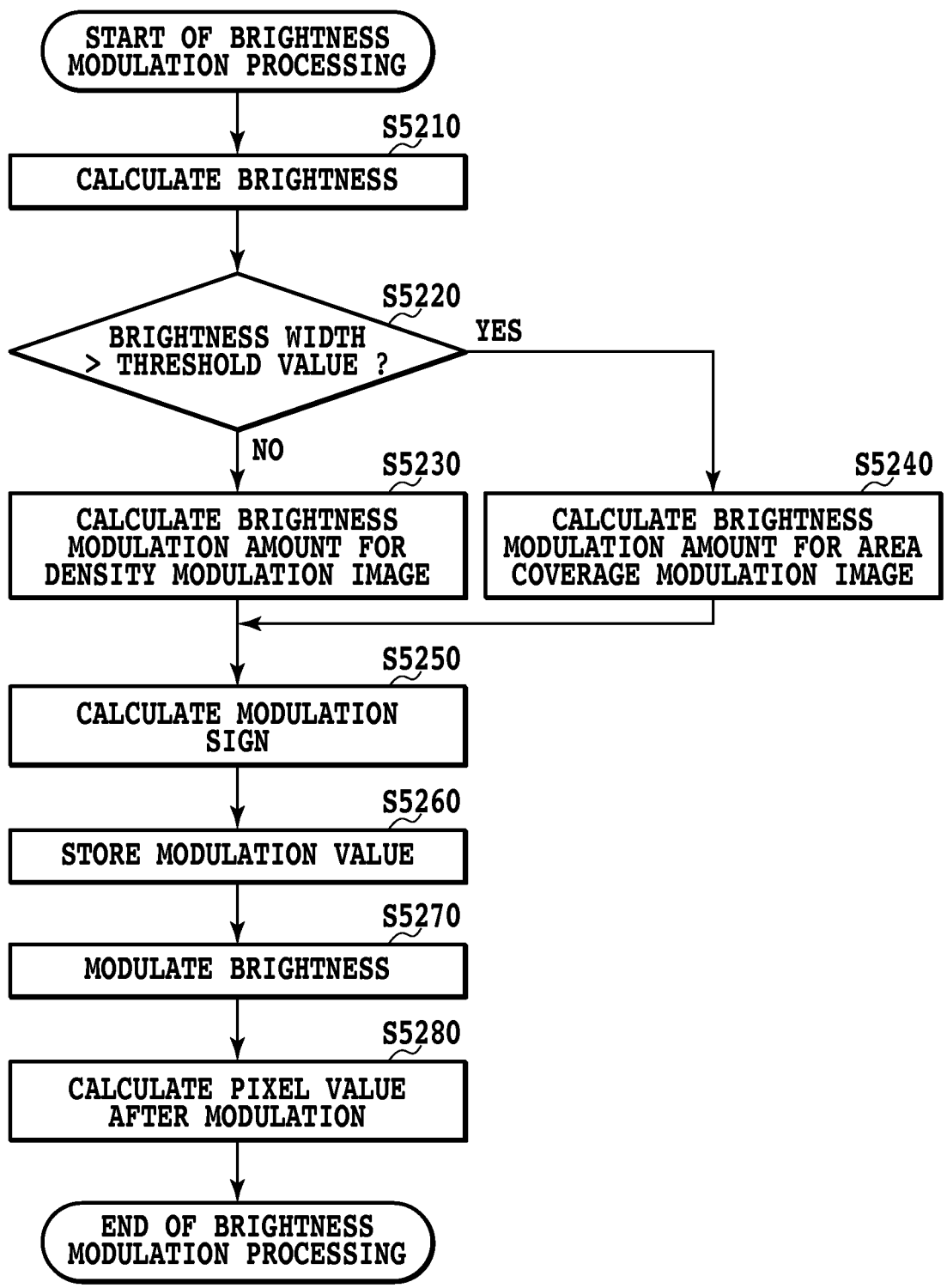
Figure 19C:
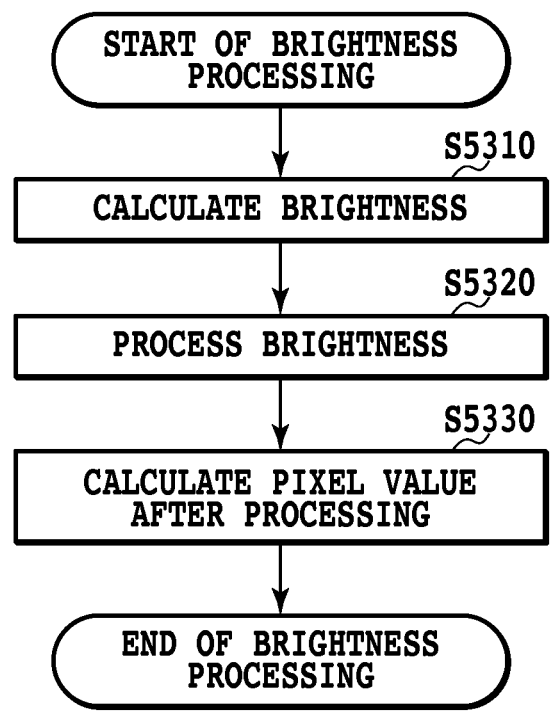

FIGS. 19A to 19C are flowcharts illustrating processing/correction processing according to a fifth embodiment of the present invention. In FIGS. 9A to 9C, Steps 5000 to 5210 and Steps 5250 to 5400 are the same as those of the above-described Steps 4000 to 4220 and Steps 4230 to 4400 and thus will not be described further.

In FIG. 19B, Step 5210 sets a processing region composed of 7 lateral pixels×7 longitudinal pixels around an object pixel as a center of the region. Based on the respective pixel values of the processing region, the brightness Y is calculated according to a formula (16).

$$Y = 0.299 \times R + 0.587 \times G + 0.114 \times B \quad (16)$$

An average of the values Y of the region of 7 pixels×7 pixels is used as the brightness value Y1 of the object pixel. An average of an attribute M of the region of 7 pixels×7 pixels is used as a pixel attribute value M' of the object pixel. Then, a weighted average may be calculated for the respective values of the region of 7 pixels×7 pixels to calculate the M' and Y1 of the object pixel while putting more importance on the object pixel and the neighborhood thereof.

Then, with regard to the values Y of the region of 7 pixels×7 pixels, the maximum value YMax and the minimum value YMin are calculated to obtain the brightness width Yw by the following formula.

$$Yw = YMax - YMin \quad (17)$$

If the object pixel is a pixel of the density modulation image, this means that the brightness values of pixels around the object pixel continuously change and thus YMax and YMin are close to each other and Yw is reduced. If the object pixel is a pixel of the area coverage modulation image on the other hand, this means that a blank part exists in the vicinity of the neighborhood of the object pixel and thus the brightness of near white is selected as YMax and thus Yw is larger than in a case of the density modulation image.

Specifically, Step 5220 determines the above-calculated brightness width based on the brightness width threshold value. More specifically, the brightness width Yw is compared with the brightness width threshold value ThYw. When Yw≦ThYw is established, the object pixel is determined as a pixel of the area coverage modulation image to proceed to Step 5240. When Yw≦ThYw is established on the other hand, the object pixel is determined as a pixel of the density modulation image to proceed to Step 5230.

Since Step 5230 is the brightness modulation processing step for a density modulation image, Step 5230 calculates dY. This calculation is the same processing as in Step 4220. On the other hand, Since Step 5240 is the brightness modulation processing step for an area coverage modulation image, dY=0 is established.

According to the above embodiment, in addition to the effect by the first embodiment, the following effect is obtained. Specifically, when a document is a density modulation image such as the one of silver halide photography, the brightness modulation is used to suppress losing of the continuous tone part. When a document is an area coverage modulation image such as the one of the halftone dot printing, the brightness modulation is not performed to maintain the image quality.

Although this embodiment determines whether the object pixel is a pixel of a density modulation image or a pixel of a brightness gray scale image by the comparison between Yw and ThYw, this discrimination may be performed by the comparison between another statistics amount for Y and the threshold value thereof. For example, variance of values of the region of 7 pixels×7 pixels may be used. Although the determination is carried out alternatively, the determination may be carried out as a multi-stage one. For example, instead of Step 5220 to Step 5240, a step of calculating dY by the following formula may be added without depending on the value of Yw.

$$dY = dY0 \, (Y1 \geq Ys)$$

$$dY = dY0 + dY\text{Max}/16 \times (1 - Y1/Ys) \times (255 - Yw)/255 \quad (Y1 < Ys) \quad (18)$$

By the above formula, dY is reduced when Yw is large enough and dY is increased when Yw is small enough.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-093551, filed Mar. 30, 2007, which is hereby incorporated by reference herein in its entirety.

What is claimed is:

1. An image processing apparatus that performs processing of image data pixel by pixel, the apparatus comprising:
    an image determination unit configured to determine whether the pixel of a processing object belongs to a non-photographic region of a character or a line or a photographic region of a photograph;
    a value modulation unit configured to modulate a signal value of a pixel, which has a signal value within a predetermined range, of the pixels of the processing object; and
    a processing unit configured to change a signal value of the pixel of the processing object which has a signal value within a predetermined range into a predetermined signal value, wherein
in a case that the pixel of the processing object belongs to the non-photographic region of the character or the line, the value modulation unit does not perform the modulation of the signal value of the pixel and the processing unit performs the processing of the signal value of the pixel, and in a case that the pixel of the processing object belongs to the photographic region of the photograph, after the value modulation unit performs the modulation of the signal value of the pixel, the processing unit performs the processing of the signal value of the pixel.

2. An image processing apparatus as claimed in claim 1, wherein the processing of image data is processing of gradation of brightness components of an image.

3. An image processing apparatus as claimed in claim 2, wherein the processing of gradation of brightness components of an image is blacking processing.

4. An image processing apparatus as claimed in claim 1, wherein the processing of image data is increasing of chroma components of an image.

5. An image processing apparatus as claimed in claim 1, wherein the value modulation unit determines a modulation amount so that the modulation is performed with a directionality according to a position of the signal value in a color space.

6. An image processing apparatus as claimed in claim 5, wherein the value modulation unit determines a positive of the modulation amount or a negative of the modulation amount in accordance with a position of an object pixel of the modulation.

7. An image processing apparatus as claimed in claim 1, wherein the value modulation unit performs the modulation of the signal value by displacing the signal value at a displacement probability according to the signal value.

8. An image processing apparatus as claimed in claim 1, wherein the signal value modulation unit conserves total sums of signal values of pixels of processing objects of the modulation, before and after the modulation of the signal value.

9. An image processing apparatus as claimed in claim 1, wherein the value modulation unit performs the modulation of the signal value in accordance with a distribution of signal values in the image data.

10. An image processing apparatus as claimed in claim 1, wherein the value modulation unit performs different modulations between the image data of an area coverage modulation and the image data of a density modulation.

11. An image processing method for processing image data pixel by pixel, the method comprising:
using a computer programmed to perform steps including:
an image determination step of determining whether the pixel of a processing object belongs to a non-photographic region of a character or a line or a photographic region of a photograph;
a value modulation step of modulating a signal value of a pixel, which has a signal value within a predetermined range, of the pixels of the processing object; and
a processing step of changing a signal value of the pixel of the processing object which has a signal value within a predetermined range into a predetermined signal value, wherein,
in a case that the pixel of the processing object belongs to the non-photographic region of the character or the line, the modulation of the signal value of the pixel is not performed and the processing of the signal value of the pixel is performed, and in a case that the pixel of the processing object belongs to the photographic region of the photograph, the modulation of the signal value of the pixel is performed and the processing of the signal value of the pixel is performed.

12. A non-transitory computer-readable storage medium retrievably storing a program that causes a computer to function as an image processing apparatus that executes an image processing method for processing image data pixel by pixel the method comprising:
an image determination step of determining whether the pixel of a processing object belongs to a non-photographic region of a character or a line or a photographic region of a photograph;
a value modulation step of modulating a signal value of a pixel, which has a signal value within the predetermined range, of the pixels of the processing object; and
a processing step of changing a signal value of the pixel of the processing object which has a signal value within a predetermined range into a predetermined signal value wherein,
in a case that the pixel of the processing object belongs to the non-photographic region of the character or the line, the modulation of the signal value of the pixel is not performed and the processing of the signal value of the pixel is performed, and in a case that the pixel of the processing object belongs to the photographic region of the photograph, the modulation of the signal value of the pixel is performed and the processing of the signal value of the pixel is performed.

13. An image processing method as claimed in claim 11, wherein the processing of image data is processing of gradation of brightness components of an image.

14. An image processing method as claimed in claim 13, wherein the processing of gradation of brightness components of an image is blacking processing.

15. An image processing method as claimed in claim 11, wherein the processing of image data is increasing of chroma components of an image.

16. An image processing method as claimed in claim 11, wherein the value modulation step determines a modulation amount so that the modulation is performed with a directionality according to a position of the signal value in a color space.

17. An image processing method as claimed in claim 16, wherein the value modulation step determines a positive of the modulation amount or a negative of the modulation amount in accordance with a position of an object pixel of the modulation.

18. An image processing method as claimed in claim 11, wherein the value modulation step performs the modulation of the signal value by displacing the signal value at a displacement probability according to the signal value.

19. An image processing method as claimed in claim 11, wherein the value modulation step conserves total sums of signal values of pixels of processing objects of the modulation, before and after the modulation of the signal value.

20. An image processing method as claimed in claim 11, wherein the value modulation step performs the modulation of the signal value in accordance with a distribution of signal values in the image data.

21. An image processing method as claimed in claim 11, wherein the value modulation step performs different modulations between the image data of an area coverage modulation and the image data of a density modulation.

* * * * *